(12) United States Patent
Boettcher et al.

(10) Patent No.: US 9,355,061 B2
(45) Date of Patent: May 31, 2016

(54) DATA PROCESSING APPARATUS AND METHOD FOR PERFORMING SCAN OPERATIONS

(71) Applicant: ARM LIMITED, Cambridge, Cambridgeshire (GB)

(72) Inventors: Matthias Lothar Boettcher, Cambridge (GB); Mbou Eyole-Monono, Cambridge (GB); Giacomo Gabrielli, Cambridge (GB)

(73) Assignee: ARM Limited, Cambridge (GB)

( * ) Notice: Subject to any disclaimer, the term of this patent is extended or adjusted under 35 U.S.C. 154(b) by 313 days.

(21) Appl. No.: 14/165,967

(22) Filed: Jan. 28, 2014

(65) Prior Publication Data

US 2015/0212972 A1    Jul. 30, 2015

(51) Int. Cl.
*G06F 9/38* (2006.01)
*G06F 15/78* (2006.01)
(Continued)

(52) U.S. Cl.
CPC .............. *G06F 15/78* (2013.01); *G06F 9/3001* (2013.01); *G06F 9/3017* (2013.01);
(Continued)

(58) Field of Classification Search
None
See application file for complete search history.

(56) References Cited

U.S. PATENT DOCUMENTS

| 4,254,467 A | 3/1981 | Davis et al. |
| 4,641,275 A | 2/1987 | Hatakeyama et al. |

(Continued)

FOREIGN PATENT DOCUMENTS

| CN | 102495721 | 6/2012 |
| EP | 2 455 854 | 5/2012 |

(Continued)

OTHER PUBLICATIONS

International Search Report and Written Opinion of the International Searching Authority issued Mar. 27, 2015 in PCT/GB2015/050007, 11 pages.

(Continued)

*Primary Examiner* — Scott Sun
(74) *Attorney, Agent, or Firm* — Nixon & Vanderhye P.C.

(57) ABSTRACT

A data processing apparatus and method are provided for executing a vector scan instruction. The data processing apparatus comprises a vector register store configured to store vector operands, and processing circuitry configured to perform operations on vector operands retrieved from said vector register store. Further, control circuitry is configured to control the processing circuitry to perform the operations required by one or more instructions, said one or more instructions including a vector scan instruction specifying a vector operand comprising N vector elements and defining a scan operation to be performed on a sequence of vector elements within the vector operand. The control circuitry is responsive to the vector scan instruction to partition the N vector elements of the specified vector operand into P groups of adjacent vector elements, where P is between 2 and N/2, and to control the processing circuitry to perform a partitioned scan operation yielding the same result as the defined scan operation. The processing circuitry is configured to perform the partitioned scan operation by performing separate scan operations on those vector elements of the sequence contained within each group to produce intermediate results for each group, and to perform a computation operation to combine the intermediate results into a final result vector operand containing a sequence of result vector elements. The partitioned scan operation approach of the present invention enables a balance to be achieved between energy consumption and performance.

28 Claims, 28 Drawing Sheets

(51) Int. Cl.
*G06F 9/30* (2006.01)
*G06F 9/00* (2006.01)

(52) U.S. Cl.
CPC ....... *G06F 9/30036* (2013.01); *G06F 9/30098* (2013.01); *G06F 9/3875* (2013.01); *G06F 9/3887* (2013.01); *G06F 9/3893* (2013.01)

(56) References Cited

U.S. PATENT DOCUMENTS

| | | | |
|---|---|---|---|
| 4,757,444 | A | 7/1988 | Aoyama et al. |
| 4,779,192 | A | 10/1988 | Torii et al. |
| 5,086,408 | A | 2/1992 | Sakata |
| 5,091,848 | A | 2/1992 | Kojima |
| 5,528,302 | A | 6/1996 | Basoglu et al. |
| 5,621,908 | A | 4/1997 | Akaboshi et al. |
| 6,049,901 | A | 4/2000 | Stock et al. |
| 6,094,637 | A | 7/2000 | Hong |
| 6,202,141 | B1 | 3/2001 | Diefendorff et al. |
| 6,223,320 | B1 | 4/2001 | Duby et al. |
| 6,542,918 | B1 | 4/2003 | Vishkin |
| 7,685,487 | B1 | 3/2010 | Kuo et al. |
| 7,877,573 | B1 | 1/2011 | Le Grand |
| 2003/0070059 | A1 | 4/2003 | Dally et al. |
| 2004/0006681 | A1 | 1/2004 | Moreno et al. |
| 2004/0181646 | A1 | 9/2004 | Ben-David et al. |
| 2005/0216706 | A1 | 9/2005 | Abdallah et al. |
| 2005/0271296 | A1 | 12/2005 | Tsuji et al. |
| 2005/0276519 | A1 | 12/2005 | Kitora et al. |
| 2008/0013622 | A1 | 1/2008 | Bao et al. |
| 2008/0040584 | A1* | 2/2008 | Hansen ............... G06F 9/30014 712/222 |
| 2008/0140750 | A1 | 6/2008 | Kershaw et al. |
| 2009/0077345 | A1 | 3/2009 | Moyer |
| 2009/0089542 | A1 | 4/2009 | Laine et al. |
| 2011/0161624 | A1 | 6/2011 | Flachs et al. |
| 2012/0131308 | A1 | 5/2012 | Dekter et al. |
| 2013/0275365 | A1 | 10/2013 | Wang et al. |

FOREIGN PATENT DOCUMENTS

| | | |
|---|---|---|
| WO | WO 2005/101190 | 10/2005 |
| WO | WO 2013/095619 | 6/2013 |
| WO | WO 2013/095629 | 6/2013 |

OTHER PUBLICATIONS

Harris et al., "Chapter 39. Parallel Prefix Sun (Scan) with CUDA", NVIDIA Developer Zone, GPU Gems 3—Chapter 39, retrieved Jan. 24, 2014, 15 pages.
Knowles, "A Family of Adders", Bristol, UK, 8 pages.
Blelloch et al., "Implementation of a Portable Nested Data-Parallel Language", School of Computer Science, Carnegie Mellon University, Pittsburgh, PA, 10 pages.
Blelloch, "Prefix Sums and Their Applications", School of Computer Science, Carnegie Mellon University, Pittsburgh, PA, 26 pages.
Chatterjee, et al., "Scan Primitives for Vector Computers", School of Computer Science, Carnegie Mellon University, Pittsburgh, PA, 10 pages.

\* cited by examiner

DATA PROCESSING APPARATUS AND METHOD FOR PERFORMING SCAN OPERATIONS

BACKGROUND OF THE INVENTION

1. Field of the Invention

The present invention relates to a data processing apparatus and method for performing scan operations.

2. Description of the Prior At

One known technique for improving performance of a data processing apparatus is to provide circuitry to support execution of vector operations. Vector operations are performed on at least one vector operand, where each vector operand comprises a plurality of vector elements. Performance of the vector operation then involves applying an operation repetitively across the various vector elements within the vector operand(s).

In typical data processing systems that support performance of vector operations, a vector register file will be provided for storing the vector operands. Hence, by way of example, each vector register within a vector register file may store a vector operand comprising a plurality of vector elements.

In high performance implementations, it is also known to provide vector processing circuitry (often referred to as SIMD (Single Instruction Multiple Data) processing circuitry) which can perform operations in parallel on the various vector elements within the vector operands. In an alternative embodiment, scalar processing circuitry can still be used to implement the vector operation, but in this instance the vector operation is implemented by iterative execution of an operation through the scalar processing circuitry, with each iteration operating on different vector elements of the vector operands.

Through the use of vector operations, significant performance benefits can be realised when compared with the performance of an equivalent series of scalar operations.

One known type of operation is a scan operation, where an identified binary operation is applied repetitively to an increasing number of data elements. The binary operation can take a variety of forms, for example an add operation, multiply operation, minimum detection operation, maximum detection operation, etc. As a result of performance of the scan operation, a sequence of results is generated, each result relating to the application of the binary operation to a different number of the data elements. As a particular example, the scan operation may specify an add operation as the binary operation, such a scan add operation sometimes being referred to as a prefix sum operation. Considering an input sequence of numbers $x_0, x_1, x_2, \ldots$ application of the scan add operation will produce a sequence of results $y_0, y_1, y_2, \ldots$, where:

$$y_0 = x_0$$

$$y_1 = x_0 + x_1$$

$$y_2 = x_0 + x_1 + x_2$$

The following are examples of papers that describe scan operations:

S. Knowles, "A family of adders," in Symposium on Computer Arithmetic, 1999. Proceedings. 14th IEEE. IEEE Comput. Soc, 1999;

G. Blelloch, S. Chatterjee, J. C. Hardwick, J. Sipelstein, and M. Zagha, "Implementation of a portable nested data-parallel language," Journal of Parallel and Distributed Computing, vol. 21, no. 1, April 1994;

S. Chatterjee, G. Blelloch, and M. Zagha, "Scan primitives for vector computers," in Proc. SUPERCOMPUTING '90. IEEE Comput. Soc. Press, 1990; and G. Blelloch, "Prefix Sums and Their Applications", School of Computer Science, Carnegie Mellon University, Pittsburgh, Pa. 15213-3890, http://www.cs.cmu.edu/~guyb/papers/Ble93.pdf.

For performance reasons, it would be advantageous to vectorise such scan operations. FIG. 1 schematically shows the serialised implementation of a vector scan operation, considering an input vector operand comprising eight vector elements $v_0$ to $v_7$ and a scalar carry-in value s. As shown, such an approach requires N processing steps and N operations, where N is the number of vector elements within the vector operand, and accordingly in this example N=8.

Such an approach might be used in low-end systems that shy away from the hardware costs associated with using vector processing circuitry to perform scan operations. Its low number of operations makes it simple and energy-efficient, but the approach does not exploit the potential performance gains from parallelisation.

FIG. 2 shows a fully parallelised approach that could be used to speed up the performance of a vector scan operation when compared with the approach of FIG. 1, for example by providing a suitable SIMD processing circuit having eight lanes of parallel processing. As shown, the scan operation is split into four discrete parts, 30, 35, 40, 45, each part involving multiple operations. The first three parts 30, 35, 40 all operate solely on the vector elements, with the final part 45 then adding the scalar value 42 to each of the vector elements resulting from performance of the third part 40 of the scan operation.

In accordance with this approach, the number of processing steps required reduces to $\log_2 N + 1$ processing steps (the additional one processing step being required to incorporate the scalar carry-in value 42), but the number of operations is given by the equation:

$$N + \sum_{i=0}^{\log_2 N - 1} (N - 2^i)$$

and hence the number of operations increases to 25. Whilst the performance benefits of such an approach are significant (in this example reducing the number of processing steps from 8 to 4), the increase in the number of operations gives rise to a significant increase in the energy consumption of the apparatus performing the vector scan operation. In particular, the dynamic energy consumption will increase due to the increase in the number of operations. In addition, the various operations required by the approach of FIG. 2 significantly increases the complexity and size of the processing circuitry required to execute those operations, which also gives rise to an increase in leakage current.

It would accordingly be desirable to provide an approach which enables a balance to be achieved between the performance, and the associated energy consumption, when performing vector scan operations.

SUMMARY OF THE INVENTION

Viewed from a first aspect, the present invention provides a data processing apparatus comprising: a vector register store configured to store vector operands; processing circuitry configured to perform operations on vector operands retrieved from said vector register store; control circuitry configured to control the processing circuitry to perform the operations required by one or more instructions, said one or more instructions including a vector scan instruction specifying a vector operand comprising N vector elements and defining a scan operation to be performed on a sequence of vector elements within the vector operand; the control circuitry being responsive to the vector scan instruction to partition the N vector elements of the specified vector operand into P groups of adjacent vector elements, where P is between 2 and N/2, and to control the processing circuitry to perform a partitioned scan operation yielding the same result as the defined scan operation, the processing circuitry being configured to perform the partitioned scan operation by performing separate scan operations on those vector elements of the sequence contained within each group to produce intermediate results for each group, and to perform a computation operation to combine the intermediate results into a final result vector operand containing a sequence of result vector elements.

In accordance with the present invention, on occurrence of a vector scan instruction defining a scan operation to be performed on a sequence of vector elements within a vector operand, control circuitry is configured to partition the N vector elements of the specified vector operand into multiple groups of adjacent vector elements, the number of groups being between 2 and N/2. The control circuitry then causes the processing circuitry to perform a partitioned scan operation yielding the same result as the defined scan operation. This involves separate scan operations being performed on the vector elements of the sequence contained within each group to produce intermediate results for each group, and further involves the performance of the computation operation to combine the intermediate results in order to produce the required sequence of result vector elements.

The inventors of the present invention determined that by performing such a partitioned scan operation, this results in a reduction in the number of operations required when compared with the approach of FIG. 2. Further, due to the separate scan operations of the partitioned scan operation operating on a reduced number of the vector elements, the inventors determined that it was possible to construct the processing circuitry hardware so as to be less complex, and hence smaller, than the processing circuitry hardware required to perform the operations of the approach of FIG. 2. This then enables a reduction in the leakage current associated with the processing circuitry. Furthermore, for certain processing circuitry hardware configurations used to implement the partitioned scan operation, it was found that such energy savings were achievable without any decrease in the performance when compared with the approach of FIG. 2. More generally, the partitioned scan operation approach of the present invention enables a balance to be achieved between energy consumption and performance.

The sequence of vector elements within the vector operand on which the scan operation is performed can vary dependent on embodiment. In one embodiment, the sequence of vector elements on which the scan operation is to be performed comprises all N vector elements within the specified vector operand. However, in an alternative embodiment, the control circuitry is configured to determine the sequence of vector elements on which the scan operation is to be performed with reference to predicate control data. The predicate control data can be specified in a variety of ways. For example, it may be predetermined, or programmable into a control register. In one embodiment, the predicate control data may be specified in the vector scan instruction itself, in order to identify which vector elements within the vector operand to be subjected to the scan operation.

In one embodiment, the only input operand for the vector scan instruction may be the vector operand. However, in an alternative embodiment, the vector scan instruction may further specify a scalar carry-in value forming an input for the defined scan operation, and the processing circuitry is configured to employ the scalar carry-in value as an input during performance of the partitioned scan operation.

There are a number of ways in which the scalar carry-in value can be incorporated into the partitioned scan operation. However, in one embodiment, the processing circuitry is configured to employ the scalar carry-in value as an input to the computation operation in order to combine the scalar carry-in value with the intermediate results during generation of the final result vector operand. This provides a particularly efficient mechanism for incorporating the scalar carry-in value into the partitioned scan operation.

The processing circuitry can take a variety of forms but in one embodiment comprises SIMD processing circuitry providing a plurality of lanes of parallel processing, each lane being configured to operate on one vector element of each vector operand provided to the SIMD processing circuitry. By such an approach, it is possible to improve performance of the partitioned scan operation when compared with an approach where scalar processing circuitry is used to implement the partitioned scan operation.

The number of lanes of parallel processing provided by the SIMD processing circuitry may be varied dependent on embodiment. However, in one embodiment, the number of lanes of parallel processing is equal to the number of vector elements in each of the P groups. Further, in one embodiment, the processing circuitry is configured to perform the separate scan operations sequentially. This enables a reduction in the complexity of the SIMD processing circuitry, hence reducing leakage current.

In one particular embodiment, the SIMD processing circuitry comprises a plurality of pipeline stages used to implement each separate scan operation, and performance of the separate scan operations is partially overlapped. Through use of such a pipelined arrangement, the performance of the partitioned scan operation can be increased.

In an alternative embodiment, the number of lanes of parallel processing is a multiple M of the number of vector elements in each of the P groups, and the processing circuitry is configured to perform M separate scan operations in parallel, with each of the M separate scan operations being allocated to a different subset of the lanes. In such an arrangement, it should be noted that whilst the M separate scan operations are performed in parallel, they are still truly separate, in that there is no operation performed involving vector elements from different groups. Such an approach may, for example, be beneficial in systems that make use of a pre-existing processing circuit to perform at least part of the partitioned scan operation, where the pre-existing processing circuit provides a number of lanes that is a multiple of the number of vector elements in each group, since it enables more efficient utilisation of the pre-existing processing circuit.

In one particular embodiment, the control circuitry is responsive to the vector scan instruction to partition the N vector elements of the specified vector operand into 2 groups. Hence, in such an arrangement, the partitioned scan operation is performed in two parts. The inventors of the present invention have determined that such an approach can give rise to significant energy savings, without sacrificing performance when compared with the approach of FIG. 2.

In one particular arrangement, the SIMD processing circuitry comprises one or more SIMD processing units used to perform said partitioned scan operation, and at least one of said one or more SIMD processing units has N/2 lanes of parallel processing. In one embodiment, a single SIMD processing unit may be used to perform both the separate scan operations and the computation operation. This single SIMD processing unit may be provided by a pre-existing processing unit also capable of performing other operations, for example a pre-existing arithmetic logic unit (ALU), or may take the form of a dedicated processing unit designed to perform the partitioned scan operation. In alternative embodiments, one or more SIMD processing units may be provided for performing the separate scan operations, with a further SIMD processing unit then being provided for performing the computation operation. In one such arrangement, the SIMD processing unit(s) used to perform the separate scan operations, and/or the SIMD processing unit used to perform the computation operation may provide N/2 lanes of parallel processing.

The computation operation may be performed in a variety of ways. However, in one embodiment, the processing circuitry is configured to perform the computation operation by performing separate computation operations on the intermediate results for each group, each separate computation operation comprising combining the intermediate results for the associated group with a carry-in value.

In one embodiment, the groups are ordered from a first group to a final group, and the processing circuitry is configured to perform the separate computation operations staggered in time such that, for all groups other than the first group, the carry-in value is provided by one of the result vector elements generated by the separate computation operation performed for the preceding group. In one particular embodiment, the separate computation operation performed for the preceding group is configured to output the relevant result vector element as a carry-out value for use as the carry-in value for the computation operation performed in respect of the next group.

In some embodiments, a separate computation operation may not be required for the first group, for example in situations where no scalar carry-in value as specified by the vector scan instruction. However, in one embodiment, a scalar carry-in value is specified, and for the first group, the carry-in value is provided by that scalar carry-in value.

In one embodiment, each separate scan operation is performed in one or more parts. Further, in one embodiment, the processing circuitry is configured to perform each part of each separate scan operation in multiple pipeline stages. With such an arrangement, performance of the separate scan operations for different groups can be overlapped within the pipeline stages of the processing circuitry.

Furthermore, in embodiments where the computation operation is performed by performing separate computation operations on the intermediate results for each group, the processing circuitry may further be configured to perform each separate computation operation in one or more pipeline stages.

In one particular embodiment, the processing circuitry is configured to perform each separate computation operation in less pipeline stages than are used to perform each part of each separate scan operation. Such an approach will be referred to herein as an unbalanced pipeline, due to the different number of pipeline stages used to perform each part of the separate scan operations and each separate computation operation, respectively. An unbalanced pipeline may result from a deliberate design choice, i.e. a slower but more efficient "scan" stage in order to reduce energy consumption, or may simply result from timing constraints inside the scan stage resulting from the multiplexing required to route vector elements to specific lanes. Furthermore, in some implementations, it has been found that such an approach can actually increase the performance of the apparatus when compared with the FIG. 2 approach. Hence, in such cases, not only is the energy consumption reduced but also the performance is increased.

In one embodiment, the control circuitry is responsive to the vector scan instruction to partition the N vector elements of the specified vector operand into N/2 groups. This provides the largest reduction in the number of operations, when compared with the fully parallelized FIG. 2 approach, albeit with a significant decrease in performance. However, when compared with the fully serialised approach of FIG. 1, it still enables an approximate 2 times increase in performance, with a requirement for only approximately 50% more operations. Hence, this can still provide a very useful approach for low priority scan operations where performance is less important.

In one embodiment, the processing circuitry may comprise one or more scalar processing units used to perform the partitioned scan operation under control of the control circuitry. Whilst such an approach can be adopted for any partitioned scan operation, it may particularly be beneficial when performing low priority scan operations as discussed above, where the vector operand is partitioned into a relatively large number of groups. In particular, in such situations, the large number of groups may give rise to an increase in the complexity of the multiplexing required in a vector processing unit in order to implement the required separate scan operations and associated computation operations. By using scalar processing circuitry, it would be possible to avoid introducing such complexities into the vector processing circuitry.

In one embodiment where predicate control data is specified, then if that predicate control data identifies that all of the adjacent vector elements in a particular group are not within said sequence of vector elements on which the scan operation is to be performed, the processing circuitry may be configured to omit processing of at least one of the separate scan operation for that particular group and the associated part of the computation operation. This can give rise to further energy savings, and also may give rise to an increase in performance in certain situations.

In one embodiment where predicate control data is specified, then that predicate control data is used to perform at least one of movement and modification of one or more vector elements within the vector operand. Hence, for example, a vector element may be moved into a different element position to the element position in which it appears in the originally specified vector operand. Such vector element movement may also be applied to intermediate vector elements produced during performance of the partitioned scan operation. In addition, or alternatively, a vector element may have its value changed, for example to a predetermined value such as a logic zero value. This provides a great deal of flexibility in how the vector elements subjected to the scan operations are determined.

In one embodiment said at least one of movement and modification of one or more vector elements within the vector operand is performed prior to performance of said partitioned scan operation. Alternatively, or in addition, said at least one of movement and modification of one or more vector elements within the vector operand may be performed during performance of said partitioned scan operation.

Viewed from a second aspect, the present invention provides a method of executing a vector scan instruction within a data processing apparatus having a vector register store for storing vector operands, and processing circuitry for performing operations on vector operands retrieved from said vector register store, the vector scan instruction specifying a vector operand comprising N vector elements and defining a scan operation to be performed on a sequence of vector elements within the vector operand, the method comprising: partitioning the N vector elements of the specified vector operand into P groups of adjacent vector elements, where P is between 2 and N/2; and controlling the processing circuitry to perform a partitioned scan operation yielding the same result as the defined scan operation, the processing circuitry performing the partitioned scan operation by: performing separate scan operations on those vector elements of the sequence contained within each group to produce intermediate results for each group; and performing a computation operation to combine the intermediate results into a final result vector operand containing a sequence of result vector elements.

Viewed from a third aspect, the present invention provides a computer program product storing in a non-transitory form a computer program for controlling a computer to provide a virtual machine execution environment for program instructions corresponding to a data processing apparatus in accordance with the first aspect of the present invention.

Viewed from a fourth aspect, the present invention provides a data processing apparatus comprising: a vector register means for storing vector operands; processing means for performing operations on vector operands retrieved from said vector register means; control means for controlling the processing means to perform the operations required by one or more instructions, said one or more instructions including a vector scan instruction specifying a vector operand comprising N vector elements and defining a scan operation to be performed on a sequence of vector elements within the vector operand; the control means, responsive to the vector scan instruction, for partitioning the N vector elements of the specified vector operand into P groups of adjacent vector elements, where P is between 2 and N/2, and for controlling the processing means to perform a partitioned scan operation yielding the same result as the defined scan operation, the processing means for performing the partitioned scan operation by performing separate scan operations on those vector elements of the sequence contained within each group to produce intermediate results for each group, and for performing a computation operation to combine the intermediate results into a final result vector operand containing a sequence of result vector elements.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
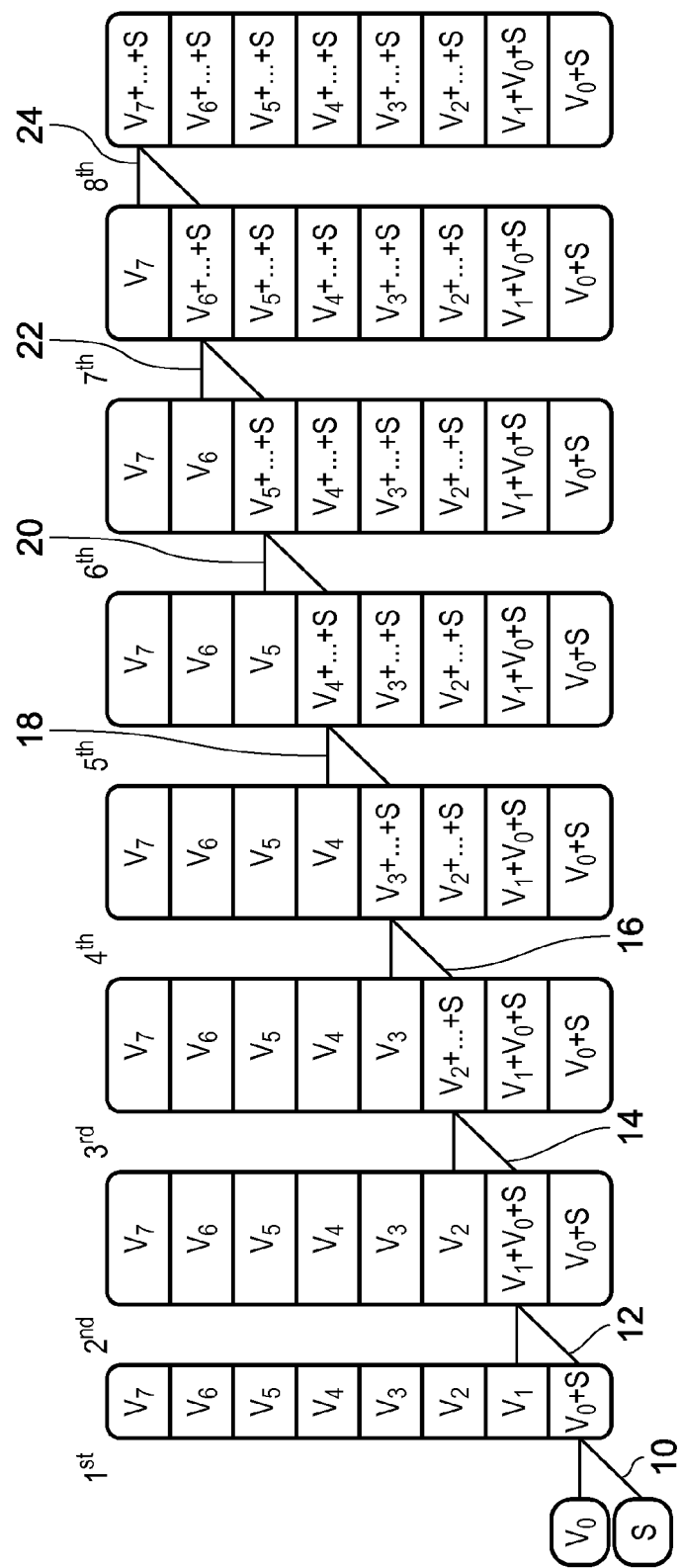
FIG. 1 schematically illustrates a serialised implementation of a vector scan operation.
Figure 2:
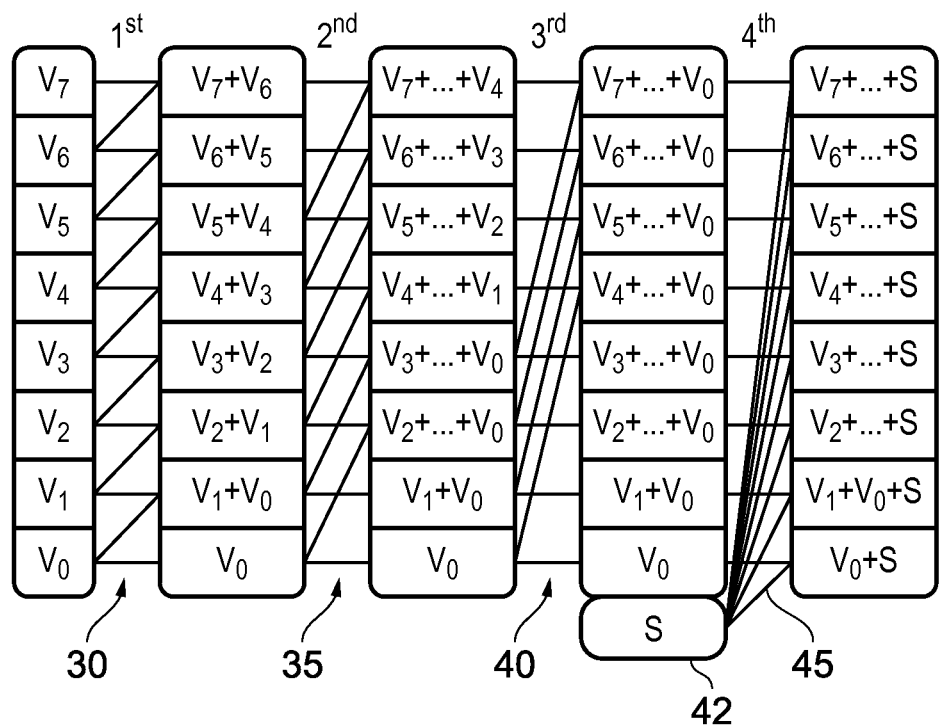
FIG. 2 schematically illustrates a fully parallelised implementation of a vector scan operation.
Figure 3:
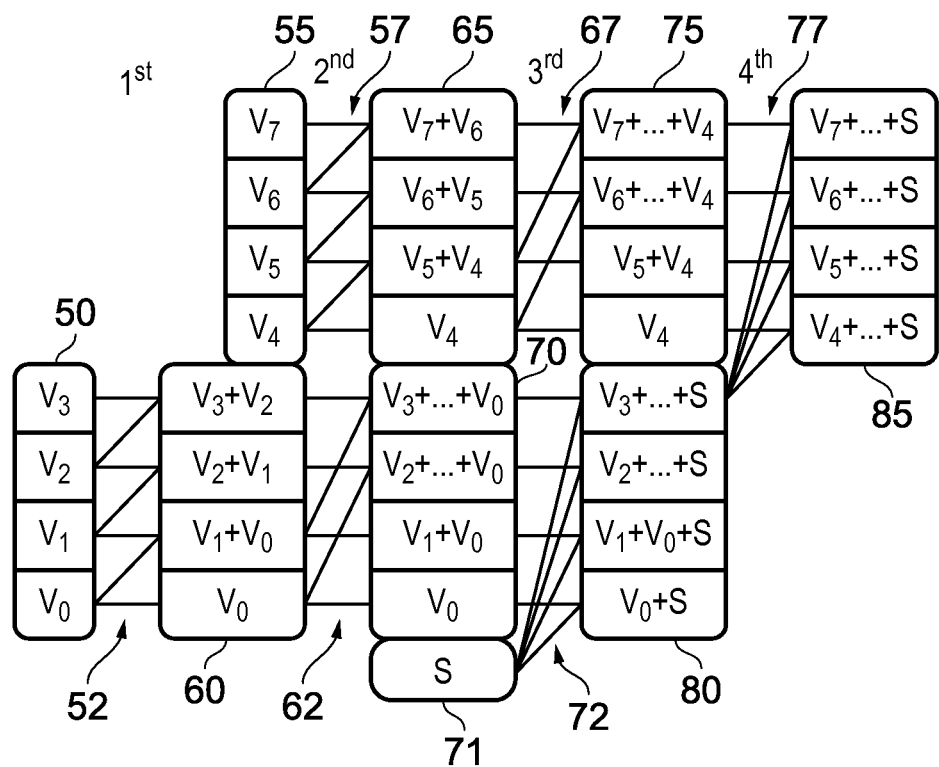
FIG. 3 schematically illustrates a partitioned vector scan operation in accordance with one embodiment.

FIG. 3 schematically illustrates a partitioned scan implementation in accordance with one embodiment. In this particular embodiment, the vector elements of the input vector operand are partitioned into two groups of adjacent vector elements, the first group 50 containing the vector elements $V_0$-$V_3$, and the second group 55 containing the vector elements $V_4$-$V_7$. Rather than performing the scan operation (in this example a scan add operation) across the entire width of the 8 vector elements as shown in the approach of FIG. 2, a partitioned scan operation equivalent to that full width scan operation is performed, requiring separate scan operations to be performed on the vector elements within each group, followed by separate computation operations performed within each group in order to produce a result operand formed by the groups 80, 85, where each vector element in the result operand provides one of the results of the partitioned scan operation.

Considering firstly the first group 50, the vector elements in that group are subjected to a separate scan operation consisting of two parts 52, 62. As shown, the first part 52 requires three operations to be performed in order to generate the revised vector element values within the top three of the four vector element positions. The final vector element position containing the vector element $V_0$ is unaltered by performance of the first part 52 of the scan operation.

The modified vector elements 60 are then used as an input for the second part 62 of the scan operation, this involving the two operations shown in order to generate revised data values in the upper two vector element positions. The resulting intermediate results 70 are then subjected to a computation operation 72, which also takes as its input the scalar value 71. In the example shown, the scalar value is added to each of the vector elements in the intermediate result, to produce the result vector elements 80.

Considering the second group 55 of vector elements, again this is subjected to a separate scan operation consisting of the two parts 57, 67, which correspond to the earlier described two parts 52, 62 of the first separate scan operation. Application of the first part 57 results in the generation of the vector elements 65, which are then input to the second part 67 resulting in the generation of the intermediate results 75. A computation operation 77 is performed using the intermediate results, and the upper most vector element of the set of results 80 produced for the first group 50, this resulting in the generation of the result vector elements 85.

In accordance with the partitioned scan implementation shown in FIG. 3, such an approach requires $\log_2(N/2)+2$ processing steps, but only $$N + 2 * \left( \sum_{i=0}^{\log_2(\frac{N}{2})-1} \left(\frac{N}{2} - 2^i\right) \right)$$

operations (here 18). Accordingly, it can be seen, when compared with the earlier described approach of FIG. 2, that the number of operations is reduced from 25 to 18, assuming the example of an input vector operand containing eight vector elements. Further, since the hardware only needs to be able to operate on half the data path width when compared with hardware performing the fully parallelised operations of FIG. 2, this enables a reduction in the hardware size, and hence produces further energy savings. In addition, with certain hardware configurations, it is possible for these energy savings to be achieved whilst retaining the same performance. In particular, assuming a pipelined processing arrangement where the individual stages of the pipeline are not reused for multiple stages of the scan, it is possible for the operations performed in respect of the second group 55 to be pipelined with the operations performed in respect of the first group 50, hence allowing the operations to complete in four processing steps as shown in FIG. 3, and hence achieve the same performance as the fully parallelised approach of FIG. 2. Each processing step may take one or more clock cycles, depending on embodiment.

Whilst in the example of FIG. 3 the vector elements of the input operand are split into two parts, as mentioned earlier they can be split into any number of groups between 2 and N/2, where N equals the number of vector elements in the input operand. Assuming the partitioned scan operation splits the vector elements into P groups, then the achievable/theoretical performance (the actual performance being additionally dependent on pipeline layout) is given by the following equation:)

$\log_2(N/P)+P$

Accordingly, this gives rise to the following table identifying the achievable/theoretical performance (in number of processing steps) for various combinations of N and P:

TABLE 1

Number of Processing steps

| N | P=1 | P=2 | P=4 | P=8 | P=16 | P=32 | P=64 |
|---|---|---|---|---|---|---|---|
| 2 | 2 | — | — | — | — | — | — |
| 4 | 3 | 3 | — | — | — | — | — |
| 8 | 4 | 4 | 5 | — | — | — | — |
| 16 | 5 | 5 | 6 | 9 | — | — | — |
| 32 | 6 | 6 | 7 | 10 | 17 | — | — |
| 64 | 7 | 7 | 8 | 11 | 18 | 33 | — |

As can be seen from the highlighted columns, execution of a two-part scan requires the same number of processing steps as for a single part scan. However, if the vector elements are split into more than two groups, and hence the scan is split into more than two parts, this increases the number of processing steps required, potentially leading to degraded performance.

The following equation identifies the total number of operations required to be performed assuming the N vector elements of the input operand as split into P groups:

$$N + P * \sum_{i=0}^{\log_2(N/P)-1} (N/P - 2^i)$$

This gives rise to the values set out in the following table for the number of operations required:

TABLE 2

Number of Operations

| N \ P | 1 | 2 | 4 | 8 | 16 | 32 | 64 |
|---|---|---|---|---|---|---|---|
| 2 | 3 | --- | --- | --- | --- | --- | --- |
| 4 | 9 | 6 | --- | --- | --- | --- | --- |
| 8 | 25 | 18 | 12 | --- | --- | --- | --- |
| 16 | 65 | 50 | 36 | 24 | --- | --- | --- |
| 32 | 161 | 130 | 100 | 72 | 48 | --- | --- |
| 64 | 385 | 322 | 260 | 200 | 144 | 96 | --- |

As can be seen, the number of operations reduces as the number of groups increases, and hence a balance can be achieved between the desired energy savings and the desired performance based on the information in both tables 1 and 2.

In one embodiment, it is assumed that the partitioned scan mechanism described above is implemented within a data processing apparatus that operates on packed registers, where the number of elements per N element vector operand depends not only on the register size, but also on the data type to be processed. For example, a 256-bit register may hold 32 8-bit vector elements, 16 16-bit data elements, 8 32-bit vector elements or 4 64-bit vector elements. In the embodiment to be described, it will be assumed that 32-bit values are the most common, and are therefore considered as the base line for the hardware design decisions. As a result, operations on smaller data types may require more processing steps than necessary, but will still be relatively energy efficient.

Figure 4A:
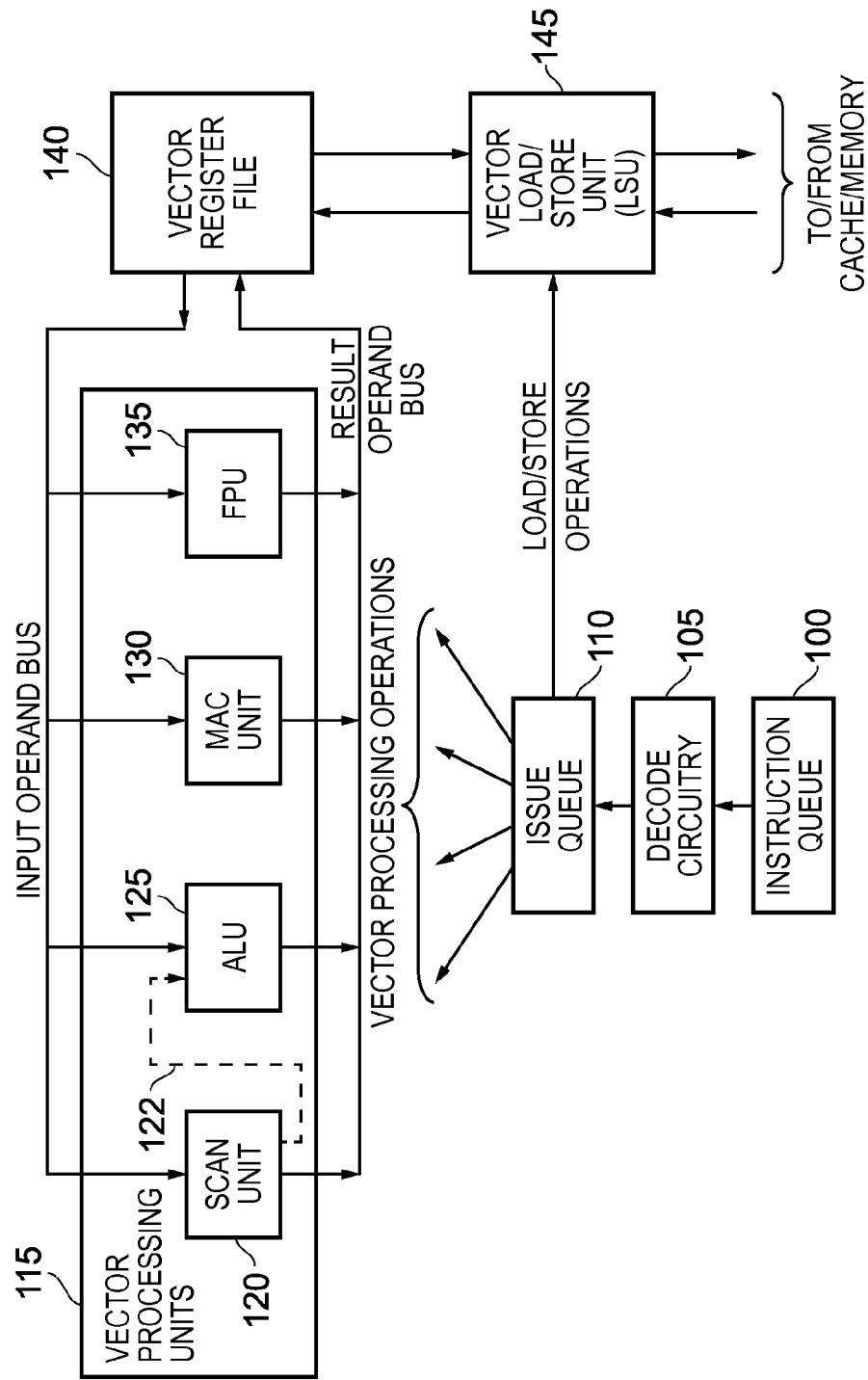
FIG. 4A is a block diagram of a data processing apparatus in accordance with one embodiment.

FIG. 4A illustrates the data processing apparatus in accordance with one embodiment. Instructions to be executed by the apparatus are placed within an instruction queue 100 from where they are passed to decode circuitry 105. The decode circuitry decodes the instructions in order to generate certain control information placed within the issue queue 110, such control information sometimes being referred to as micro-ops. The issue queue will then dispatch appropriate control information to the relevant processing units within the apparatus in order to cause the operations specified by the received instructions to be performed.

In the example shown, a plurality of vector processing units 115 are provided, these including a scan unit 120, an arithmetic logic unit (ALU) 125, a multiply accumulate (MAC) unit 130 and a floating point unit (FPU) 135. Accordingly, floating point operations identified in the issue queue 110 will be forwarded to the FPU 135 for handling, multiplication and/or multiply accumulate operations will be passed to the MAC unit 130, and standard arithmetic operations will be passed to the ALU 125. The scan unit 120 may itself be formed by another arithmetic logic unit, or can be a dedicated unit provided for performing the scan operations of the described embodiments. The use of the scan unit will be discussed in more detail later, but in one embodiment the scan unit 120 may be used in combination with the ALU 125 in order to perform the required partitioned scan operations, with a forwarding path 122 being used between the scan unit 120 and the ALU 125.

The various input operands required by the vector processing unit 115 will be read from registers within the vector register file 140. In addition, result operands generated by each of the units will typically be stored back to destination registers within the vector register file 140. Load and store instructions will be used to cause corresponding load and store operations to be performed by the vector load/store unit (LSU) 145 in order to cause operand data to be loaded from memory into specified registers of the vector register file 140, or for the current contents of one or more of the vector registers to be stored back to memory.

Figure 4B:
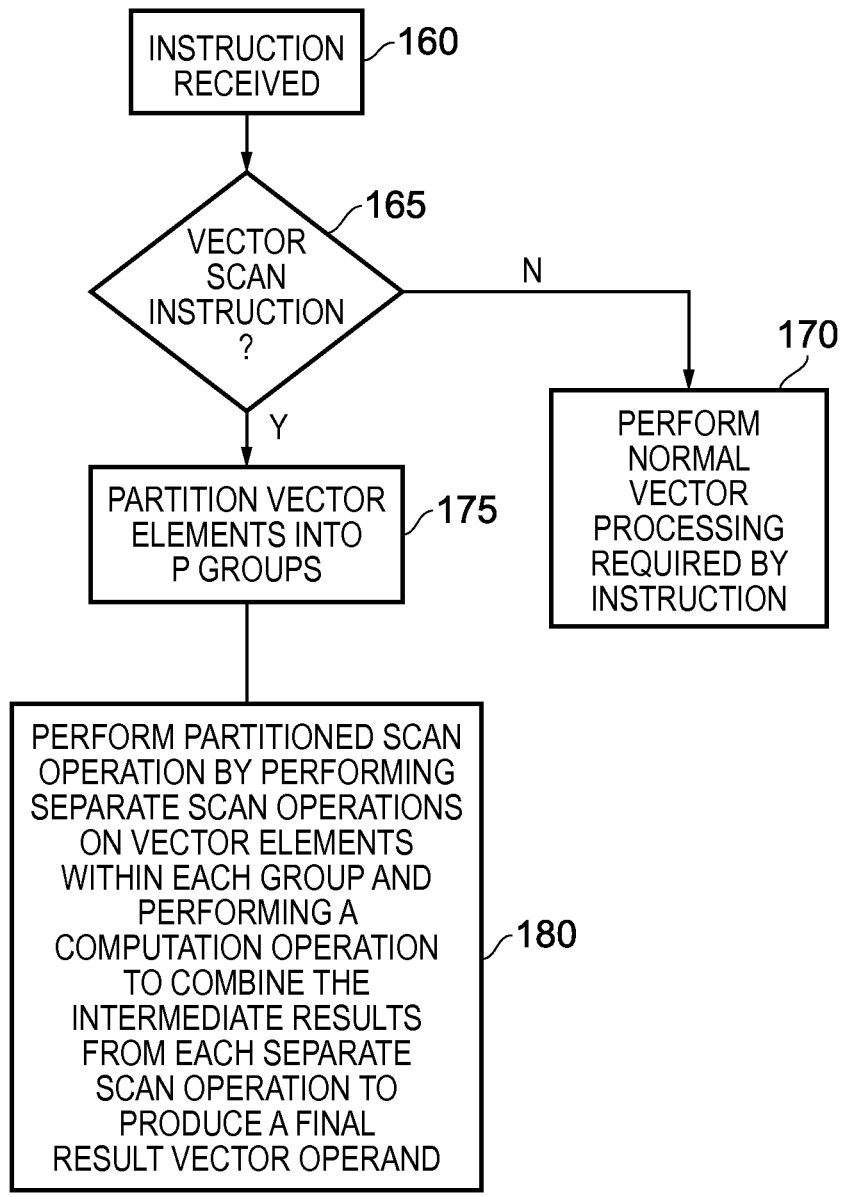
FIG. 4B is a flow diagram illustrating how the apparatus of FIG. 4A processes a vector scan instruction in accordance with one embodiment.

FIG. 4B is a flow diagram describing how the circuitry of FIG. 4A is used to process a vector scan instruction within the instruction queue 100. At step 160, an instruction is received by the decode circuitry 105 from the instruction queue 100. Thereafter, it is determined whether the received instruction is a vector scan instruction or some other vector instruction. If it is not a vector scan instruction, then the process proceeds to step 170, where normal vector processing required by the instruction is performed. This will involve the decode circuitry decoding the instruction in order to generate appropriate control information for storage in the issue queue, with that information then being used to trigger the appropriate vector processing unit to perform the required operation(s).

However, in the event that the instruction is a vector scan instruction, then the process proceeds to step 175 where the vector elements of the vector operand specified by the vector scan instruction are partitioned into P groups. The value P may be determined in various ways. For example, it may be predetermined how many groups the vector elements are partitioned into. In one particular embodiment, the datatype specified with each instruction in conjunction with the hardware SIMD width implicitly describes the number of groups/ parts. The SIMD width may vary between functional units and is not necessarily known to the programmer.

Thereafter, one or more of the vector processing units 115, for example in one embodiment the scan unit 120 in combination with the ALU 125, are used to perform a partitioned scan operation by performing separate scan operations on the vector elements within each group, and then performing a computation operation to combine the intermediate results from each separate scan operation in order to produce a final result vector operand.

It should be noted that exactly where within the apparatus of FIG. 4A the vector elements are partitioned into the P groups, and the various separate scan operations and computation operations are identified, can vary dependant on embodiment. For example, the decode circuitry 105 could be arranged to decode the instruction in order to directly generate as micro-ops control information specifying the separate scan operations and computation operations, which are then stored within the issue queue 110. The decode circuitry may also directly identify the vector elements associated with each of those operations by effectively performing the partitioning of step 175. Alternatively, the decode circuitry 105 may merely identify that a vector scan operation is required, and the issue queue 110 may include associated control circuitry for generating the separate scan operations and computation operations, and issuing those operations to the required units along with an identification of the required vector elements for each separate operation. As a yet further example, the scan unit 120 itself may include certain control circuitry for partitioning the vector elements into the groups and scheduling the various separate scan operations and computation operations required in order to perform the partitioned scan operation.

Figure 5:
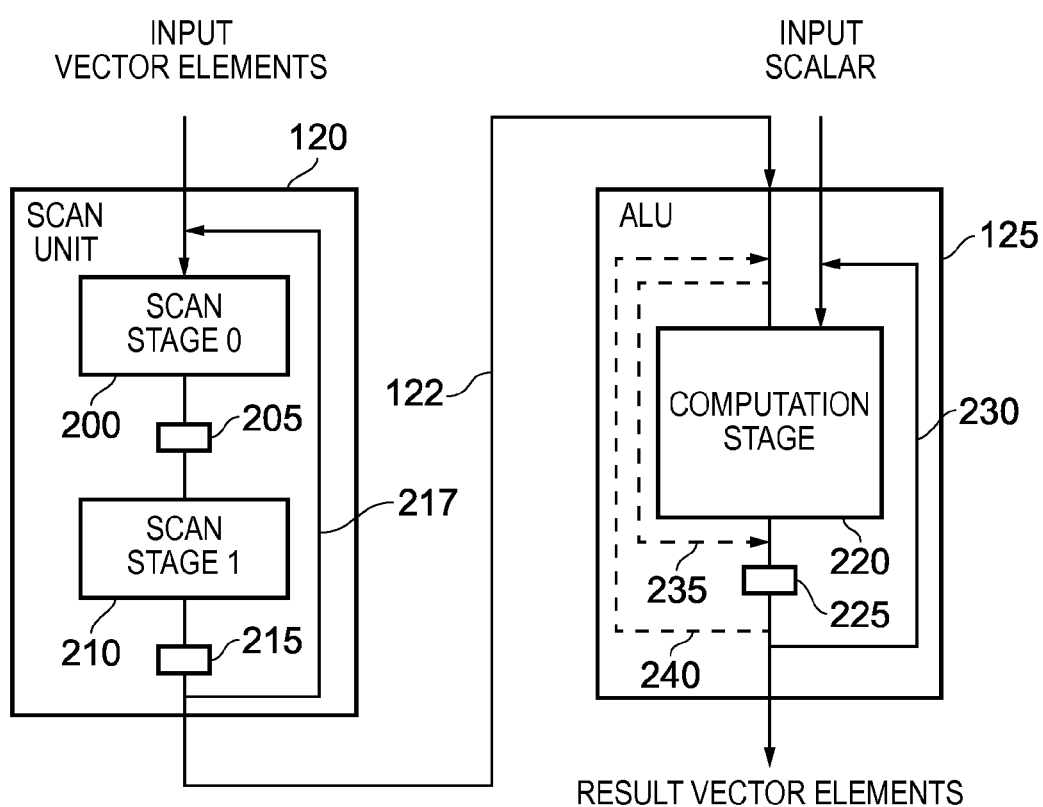
FIG. 5 is a block diagram illustrating the scan unit and ALU of FIG. 4A in accordance with one embodiment.

FIG. 5 illustrates in more detail the scan unit 120 and ALU 125 in accordance with one embodiment. In this embodiment, the scan unit comprises two separate scan stages 200, 210, with the results from each stage being latched in associated storage elements 205, 215, which may for example be formed from flip flops. A forwarding path 217 is provided for enabling the results latched in the storage element 215 to be routed back as an input to the scan stage 200. The results in the storage element 215 can also be forwarded over path 122 as an input to a computation stage 220 provided within the ALU 125. The results of the computation stage are then stored within the storage element 225. An input scalar value can also be provided to the computation stage 220. Further, as shown by the forwarding path 230, one of the vector elements stored in the storage element 225 can be forwarded back as a scalar input for another computation within the computation stage 220, this allowing performance for example of the computation operation 77 of FIG. 3 using one of the result vector elements from the earlier performance of the computation operation 72 forwarded back as the scalar input for that computation.

As will also be described with reference to some of the later figures, forwarding paths 235, 240 may be provided within the ALU for enabling certain vector elements to bypass the computation stage, and then to be routed back into the computation stage at a later point.

Figure 6A:
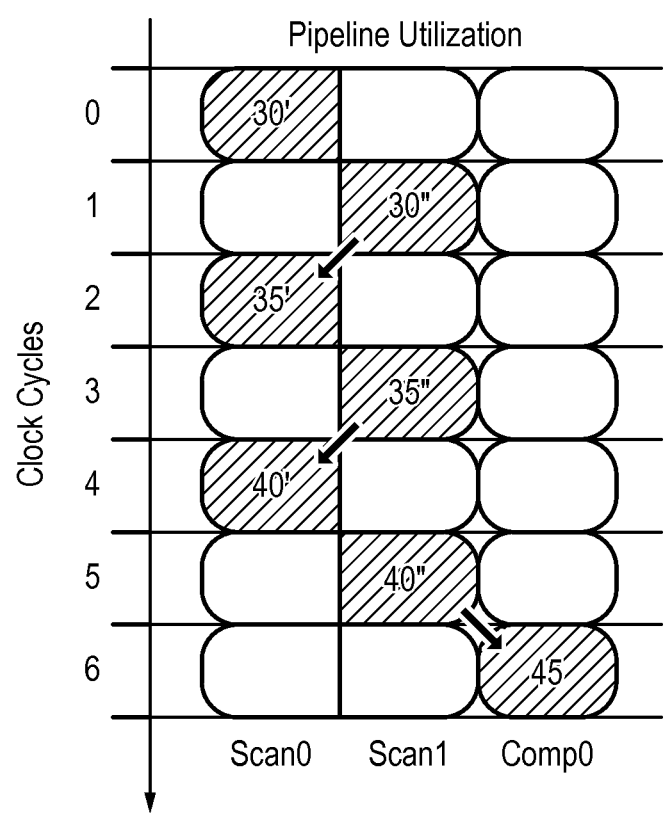
FIG. 6A illustrates the number of clock cycles required to perform the fully parallelised scan operation of FIG. 2 assuming a scan unit and an ALU of the form of FIG. 5 are provided so as to both have N (in this case eight) lanes of parallel processing.

FIG. 6A schematically illustrates the pipeline utilisation of the circuitry of FIG. 5 if it were configured to perform the fully parallelised scan operation of FIG. 2. It should be noted that to enable the fully parallelised scan operation to be performed, both the scan unit 120 and the ALU 125 would have to be large enough to support N lanes of parallel processing to accommodate the full N vector elements. In FIG. 6A, the same reference numerals have been used as were used for the various separate parts of the process of FIG. 2, but with the symbol "being used to denote scan stage 0 and the symbol "being used to denote scan stage 1. Accordingly, in clock cycle 0, the part 30 of the scan operation passes through the scan stage 0 200, as indicated by the reference numeral 30', and then in cycle 1 that first part 30 of the scan operation passes through scan stage 1 210, as indicated by the reference numeral 30". Due to the data dependency between the first part 30 and the second part 35 of the scan operation, the second part 35 cannot start until the first part has completed. Hence, it can be seen that the second part 35 is then performed in cycles 2 and 3 using scan stage 200 and scan stage 210 of the scan unit 120, and then similarly the third part 40 is performed in clock cycles 4 and 5, again using the scan stages 200 and 210. At this point, the result data in the storage elements 215 is forwarded over path 122, where it is passed through the computation stage 230, along with the scalar input, in order to implement the fourth part 45 of the scan operation. Accordingly, it can be seen that seven clock cycles are required in total.

Figure 6B:
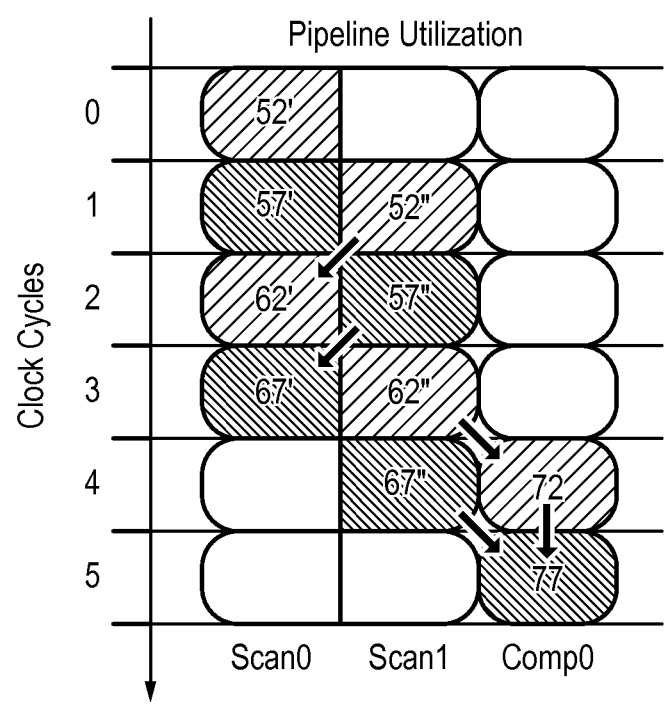
FIG. 6B illustrates the number of clock cycles required to perform the partitioned scan operation of FIG. 3 using the apparatus of FIG. 5, where both the scan unit and the ALU have N/2 lanes of parallel processing.

However, FIG. 6A is merely provided as a benchmark for the number of clock cycles that may be required. In practice, in accordance with the described embodiments, the scan operation is implemented as a partitioned scan operation. FIG. 6B illustrates how the circuitry of FIG. 5 may be used to implement the partitioned scan operation of FIG. 3, where the input operand is split into two groups of vector elements. Again, the various parts of the separate scan operations 52, 57, 62 and 67 are labelled within FIG. 6B using the "and " notations to identify the two stages required to perform each part of those separate scan operations. Hence, in cycle 0, the first part 52 of the separate scan operation performed on the first group 50 enters scan stage 200. In the next clock cycle, that part 52 then enters the scan stage 210. However, since there is no data dependency between the part 52 and the part 57, the part 57 of the separate scan operation associated with the second group 55 can now enter scan stage 200. As can be seen from FIG. 6B this hence enables very effective utilisation of the scan unit 120 to perform the required separate parts of each separate scan operation. The computation operation 72 can then be performed in cycle 4. By cycle 5, both the results of the computation operation 72, and of the part 67 of the separate scan operation in respect of the second group are available, and accordingly the computation operation 77 can be performed in clock cycle 5.

Accordingly, it can be shown that when using the circuitry of FIG. 5, partitioning the scan into two parts can actually reduce the number of clock cycles from 7 to 6. This is due to the efficient way in which the two stages of the scan unit 120 are used to perform the required separate scan operations. Further, each of the scan unit 120 and ALU 125 only need to have a data path width of N/2, since only half of the vector elements are operated on by each of the operations shown in FIG. 3. Accordingly the scan unit 120 and ALU 125 can be made to be more compact, and hence can produce less leakage current. Further, as already discussed earlier, the total number of operations required is reduced when compared with the fully parallelised approach of FIG. 2, again giving energy savings. If the scan unit 120 is a dedicated unit, it can be configured to only provide N/2 lanes of parallel processing. Assuming however the ALU 125 is also provided to support other vector operations which may use all N vector elements, then the ALU may be configured to use per-lane predication in order to only operate on half of the available lanes when performing the final computation operations of the earlier-described partitioned scan operations.

Figure 6C:
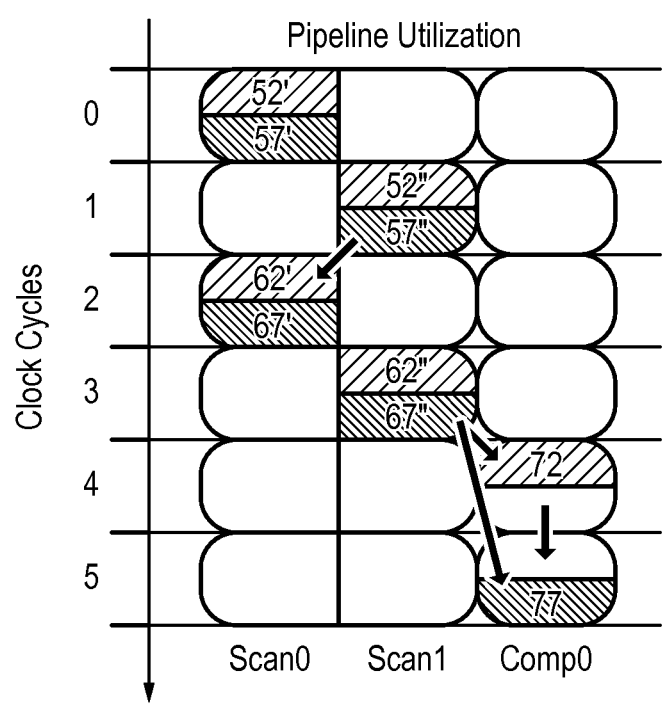
FIG. 6C illustrates the number of clock cycles required to perform the partitioned scan operation of FIG. 3 using the apparatus of FIG. 5, where both the scan unit and the ALU have N lanes of parallel processing.

FIG. 6C illustrates an alternative embodiment where both the scan unit 120 and the ALU 125 may provide N lanes of parallel processing, and in this embodiment corresponding parts of separate scan operations are performed in parallel within different subsets of the lanes. Accordingly, the parts 52, 57 of the two separate scan operations associated with the two different groups 50, 55 can be performed in parallel, as can the second parts 62, 67 of the two separate scan operations. It should be noted that in this embodiment there are two entirely separate scans being performed, since there are no operations interacting between the vector elements of the first group 50 and the vector elements of the second group 55.

As shown in FIG. 6C, the computation operations still need to be performed in separate clock cycles, given the dependency between the computation operation 72 and the computation operation 77 (this latter operation requiring one of the results produced by the former operation). It should be noted that with such a configuration the intermediate results produced by the part 67 of the second separate scan operation need to be preserved from the end of clock cycle 3 until clock cycle 5, where they will then be used by the computation operation 77. This can be achieved by providing a temporary register, for example within the forwarding path 122, or providing some other mechanism for buffering the data for one cycle. Alternatively, as indicated by the dotted paths 235, 240 in FIG. 5, the vector elements associated with the intermediate result 75 can bypass the computation stage 220 whilst the computation operation 72 is being performed, and can then be routed back in the next clock cycle over path 240 to form the required vector input to the computation stage 220 when the computation operation 77 is being performed. In each of cycles 4 and 5, inactive lanes in the ALU can be clock gated to reduce dynamic energy consumption.

In the example illustrated with reference to FIG. 6C, it is assumed that the scan unit 120 provides N lanes of parallel processing. The ALU 125 only needs to operate on half the data path width and accordingly could be provided with N/2 lanes of parallel processing, or may instead provide N lanes of parallel processing, with per-lane predication being used to identify the N/2 lanes to be operated on for any particular computation.

In the example of FIG. 5, it will be appreciated that the scan unit 120 has two separate stages 200, 210, whereas the ALU 125 has a single stage 220. Hence, the scan unit 120 can be considered to be a relatively slow but energy optimised functional unit, whilst the ALU 125 can be seen to be a fast functional unit. Such an arrangement will be referred to herein as an unbalanced pipeline since the number of stages provided for the separate scan operations differs from the number of stages provided for the separate computation operations. Nevertheless, as will be apparent from FIG. 6A to 6C, such an arrangement can give rise to good performance whilst still enabling the energy savings associated with the partitioned scan approach to be realised.

Figure 7:
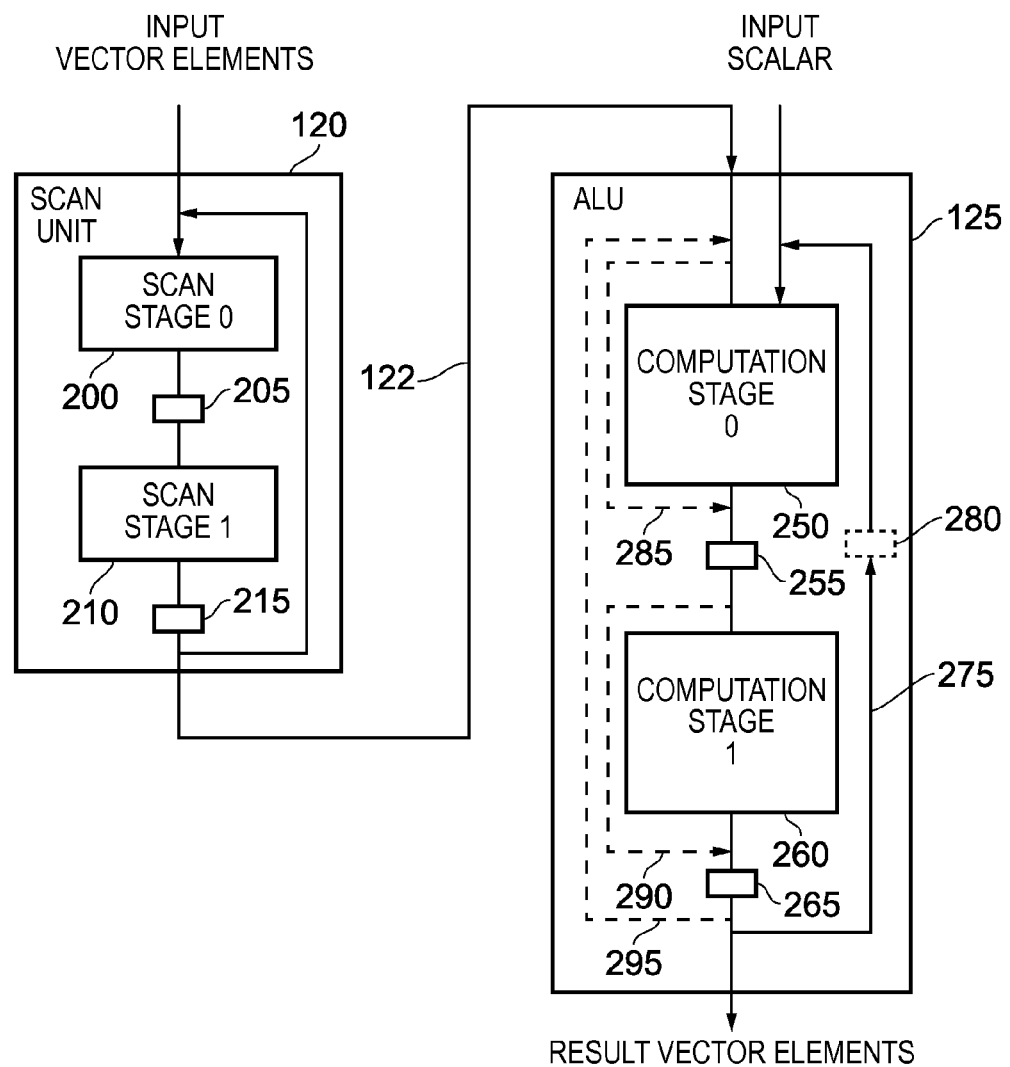
FIG. 7 is a block diagram illustrating the scan unit and ALU of FIG. 4A in accordance with an alternative embodiment.
Figure 8A:
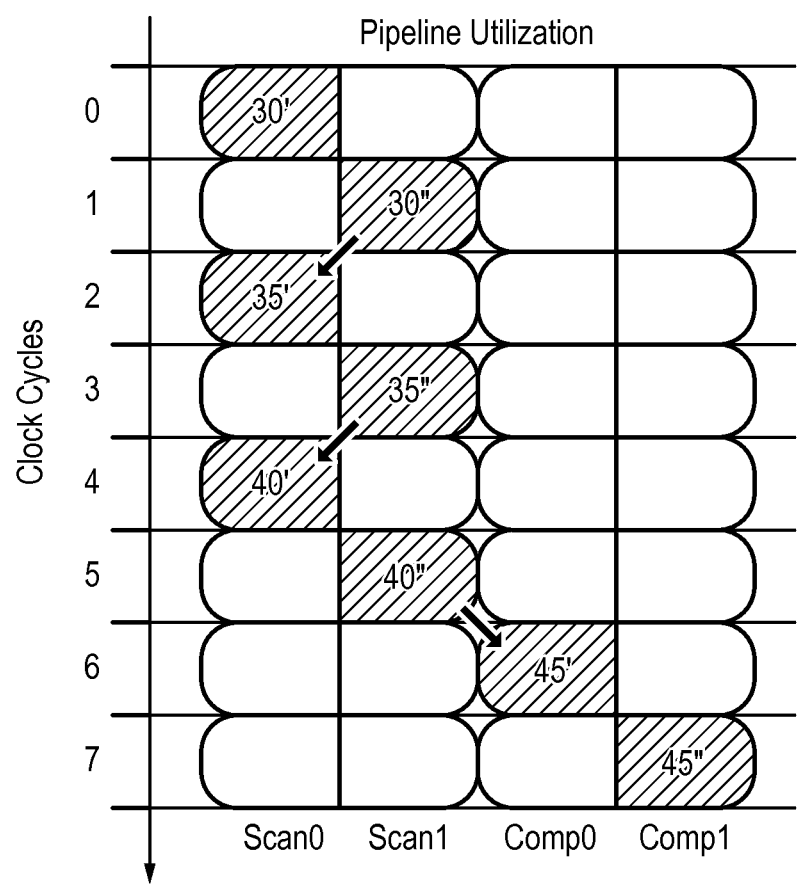
FIG. 8A illustrates the number of clock cycles required to perform the fully parallelised scan operation of FIG. 2 assuming a scan unit and an ALU of the form of FIG. 7 are provided so as to both have N (in this case eight) lanes of parallel processing.

In an alternative embodiment, a balanced pipeline can be provided, such as shown in FIG. 7. In this embodiment, the scan unit 120 is as discussed earlier with reference to FIG. 5, but the ALU 125 includes two separate computation stages 250, 260 with the output of those computation stages being temporarily stored in the storage elements 255, 265. Hence, in this embodiment, the computation operations are also performed in two cycles, in addition to the two cycles needed for each part of the separate scan operations. FIG. 8A is a pipeline utilisation diagram similar to that of FIG. 6A, and hence assumes that the fully parallelised approach of FIG. 2 is performed, with both the scan unit and the ALU having N lanes of parallel processing. As can be seen from a comparison of FIG. 8A with FIG. 6A, the only difference is that the computation stage is performed over two cycles, and accordingly the number of cycles required increases from 7 to 8.

Figure 8B:
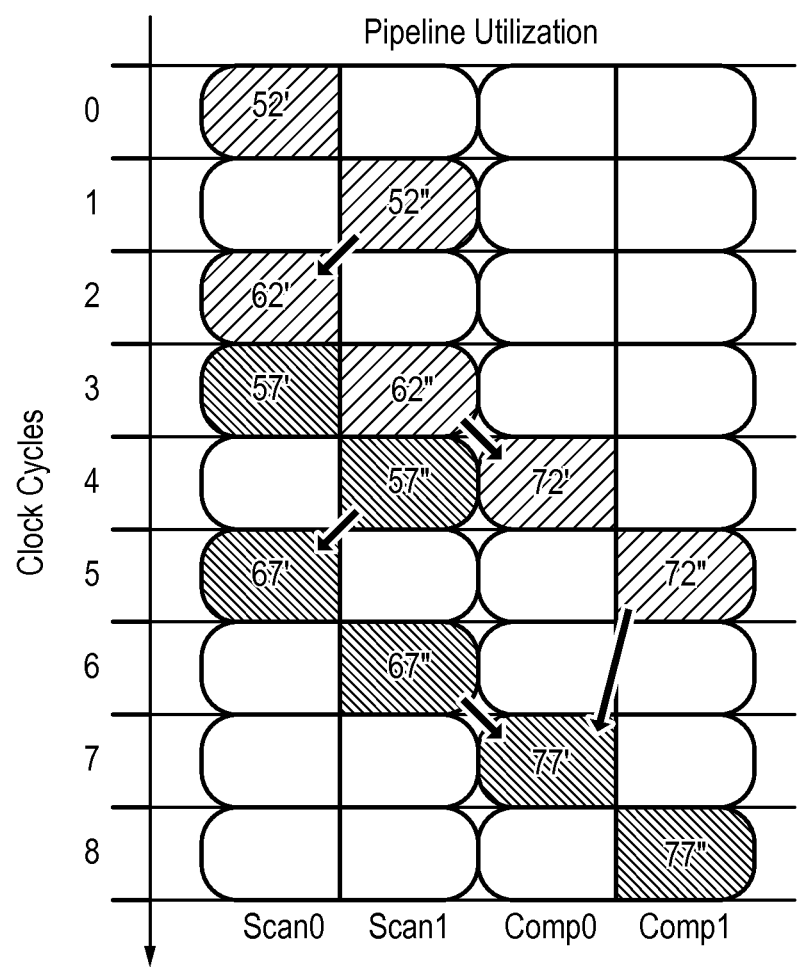
FIG. 8B illustrates the number of clock cycles required to perform the partitioned scan operation of FIG. 3 using the apparatus of FIG. 7, where both the scan unit and the ALU have N/2 lanes of parallel processing.

FIG. 8B corresponds with the earlier described FIG. 6B, but assumes that the apparatus of FIG. 7 is used instead of the earlier described apparatus of FIG. 5. As is apparent from a comparison of FIG. 8B with FIG. 6B, executing the partitioned scan in two parts (one for each of the two groups of FIG. 3) on a balanced pipeline increases the number of cycles required. This is due to the dependency between the computation stages of the two parts, which requires the scan stages of the second separate scan operation to be delayed in order to avoid them clashing with the scan stages of the first separate scan operation. However, the energy savings due to the lower number of operations involved in the partitioned scan approach are still realised. Further, both the scan unit 120 and the ALU 125 only need to operate on half the full data path width. Again, a pre-existing ALU 125 can be reused, with per-lane predication identifying the N/2 lanes to be operated on for each computation operation.

Figure 8C:
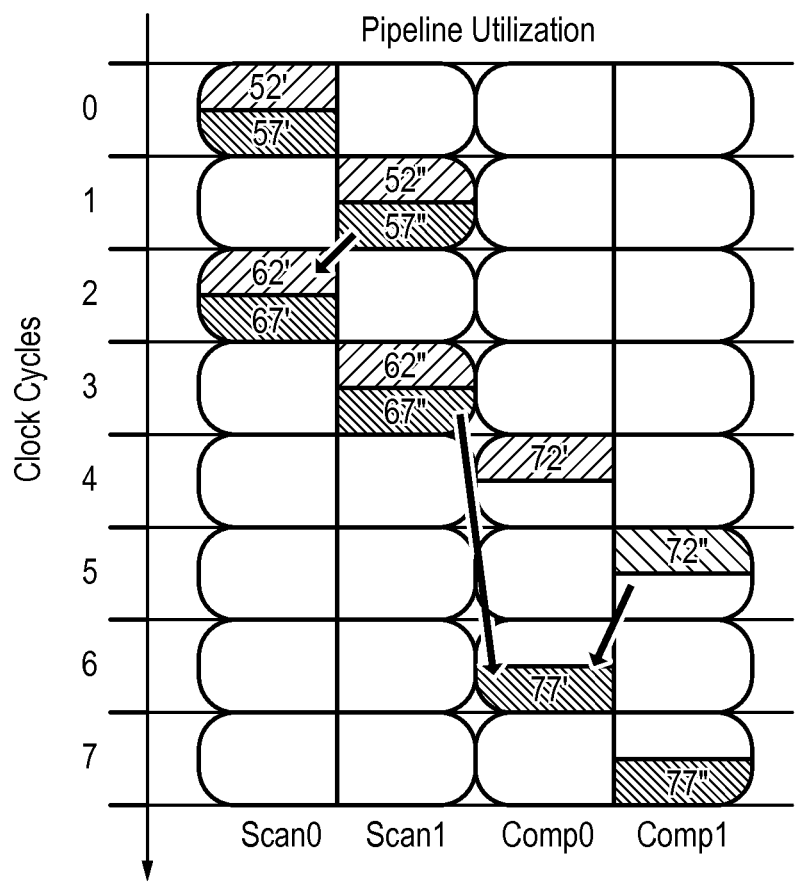
FIG. 8C illustrates the number of clock cycles required to perform the partitioned scan operation of FIG. 3 using the apparatus of FIG. 7, where both the scan unit and the ALU have N lanes of parallel processing.

FIG. 8C corresponds with the earlier described FIG. 6C, but again assumes the balanced processing arrangement of FIG. 7 is used rather than the unbalanced arrangement of FIG. 5. From a comparison of FIG. 8C with FIG. 8A, it can be seen that by executing the corresponding parts of the two separate scan operations in parallel within different sub-sets of the lanes, the same performance can be achieved as the fully parallelised variant. Whilst the scan stages operate on the full data path width, by processing corresponding parts of the two separate scan operations in parallel, the computation operations still need to be performed on half the data path width due to the data dependency between the two computation operations 72, 77.

As can be seen from FIG. 8C, the results from the execution of the part 67 of the second separate scan operation produced at the end of cycle 3 need to be maintained until cycle 6 where they are then consumed by the corresponding computation operation 77. This can be achieved by providing appropriate buffering structures within the apparatus, or alternatively can be achieved by using the various forwarding paths 285, 290, 295 shown in the ALU 125 of FIG. 7. In particular, the vector elements forming the intermediate results 75 shown in FIG. 3 are forwarded over paths 285 and 290, thereby retaining those values for two clock cycles, whereafter they are returned over path 295 to form an input to the computation stage 250 at the time it is to perform the computation operation 77.

As is apparent from FIG. 8B, the uppermost vector element in the result 80 produced following completion of the computation operation 72 needs to be maintained for one clock cycle before it is forwarded as a scalar input for the computation 77. As shown in FIG. 7, this can be achieved by inserting a temporary buffer element 280 within the forwarding path 275. Whilst that additional buffer element may be needed when implementing the approach of FIG. 8B, it is not needed when implementing the approach of FIG. 8C, and instead the required vector element can be routed back directly over path 275 to form the scalar input for the beginning of the computation operation 77.

Figure 9A:
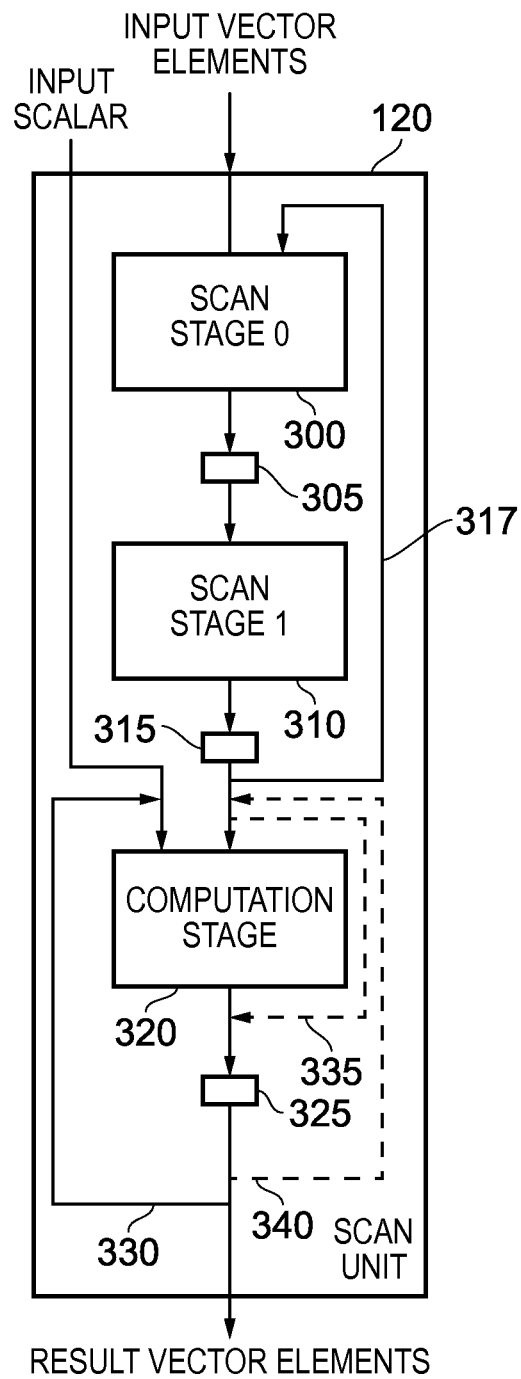
FIGS. 9A and 9B are block diagrams illustrating dedicated scan units in accordance with two different embodiments, where both the separate scan operations and computation operations of the partitioned scan operation can be performed within the scan unit.

In the examples of FIGS. 5 and 7, it is assumed that a scan unit and a separate ALU 125 are used. Alternatively, the circuitry required for the computation operations can be incorporated directly within a dedicated scan unit. Accordingly, FIG. 9A shows the resultant dedicated scan unit 120 that could be provided in place of the circuitry of FIG. 5 in accordance with one embodiment. As shown, the scan unit 120 includes two scan stages 300, 310 whose results are temporarily stored in the storage element 305, 315, respectively. A forwarding path is 317 is then provided to enable the results stored in the storage element 315 to be routed back as an input to the scan stage 300. The computation stage 320 then corresponds with the computation stage 220 shown in FIG. 5, and has a storage element 325 into which its results are temporarily stored. A forwarding path 330 is provided for forwarding one of the result vector elements as a scalar input for a subsequent iteration, and in addition forwarding paths 335, 340 are provided for performing the same functionality as described with reference to the forwarding paths 235, 240 of FIG. 5.

Figure 9B:
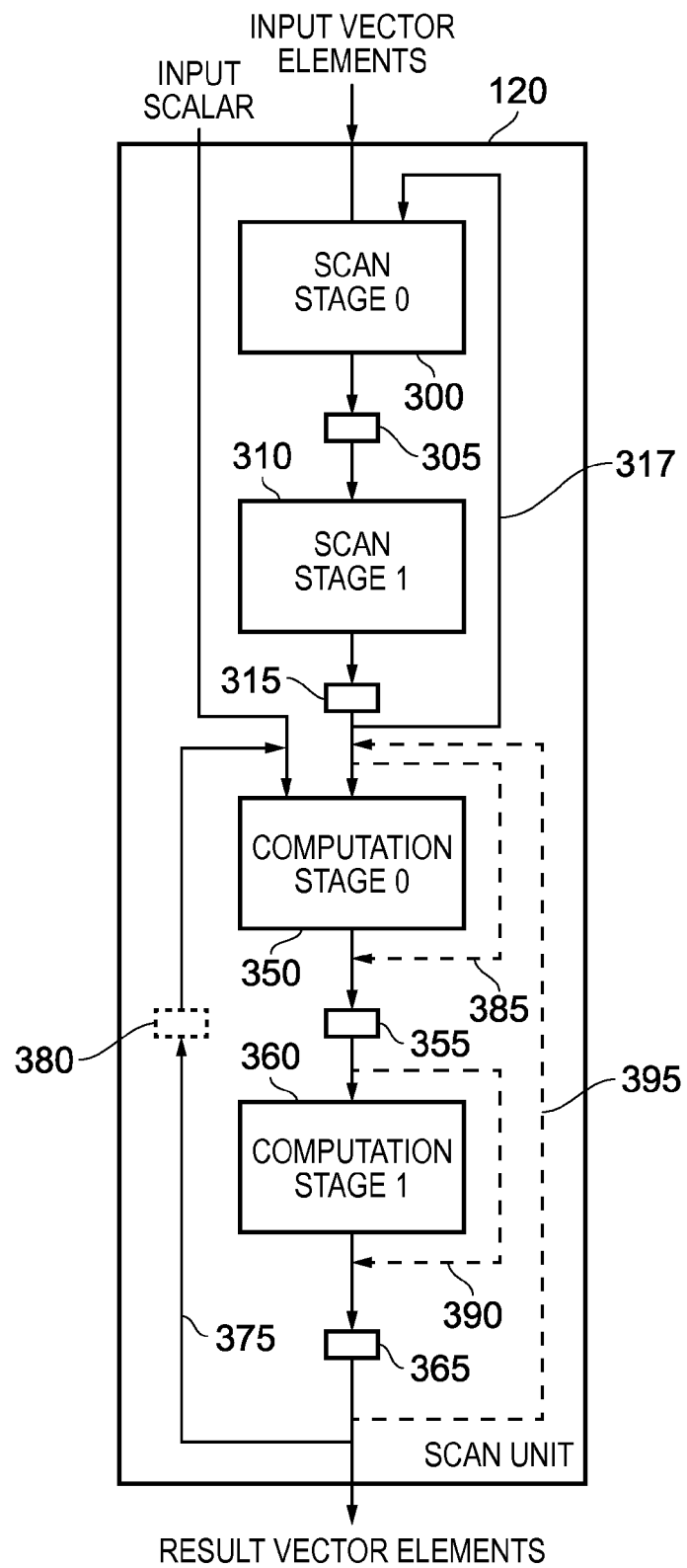

FIG. 9B illustrates a dedicated scan unit 120 that could be used in place of the balanced pipeline of FIG. 7. The scan stages are unchanged, but the computation stage 320 of FIG. 9A is now replaced with two separate computation stages 350, 360, each with associated storage elements 355, 365 for storing their outputs. The forwarding path 375 and associated optional storage element 380 corresponds with the forwarding path 275 and associated optional storage element 280 of FIG. 7. Similarly, the forwarding paths 385, 390, 395 correspond with the forwarding paths 285, 290, 295 of FIG. 7.

As another alternative embodiment, rather than providing a separate scan unit, an existing ALU can be modified to incorporate the necessary multiplexing and data routing paths to enable the ALU to be used to perform both the separate scan operations and the required computation operations. This may particularly be an option where the amount of partitioning is small, for example in the above described two part scan approach, since the multiplexing requirements may not unduly add to the complexity of the ALU circuitry. However, it may be unbeneficial when performing a higher degree of partitioning such as when generating N/2 separate groups for the partitioned scan operation.

Figure 10:
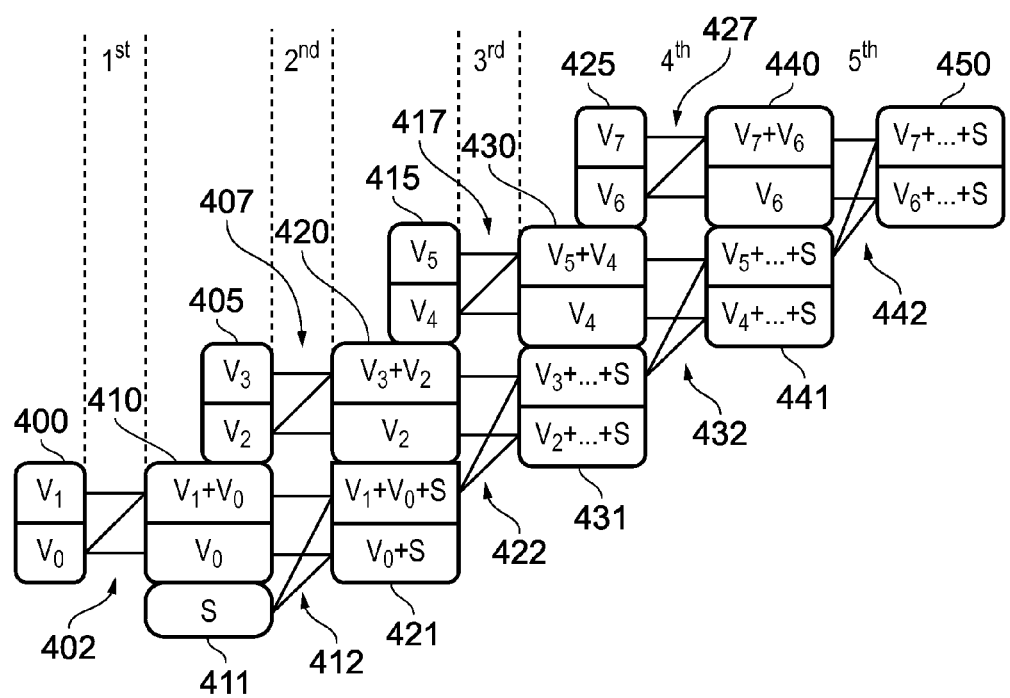
FIG. 10 schematically illustrates a partitioned vector scan operation in accordance with an alternative embodiment.
Figure 12:
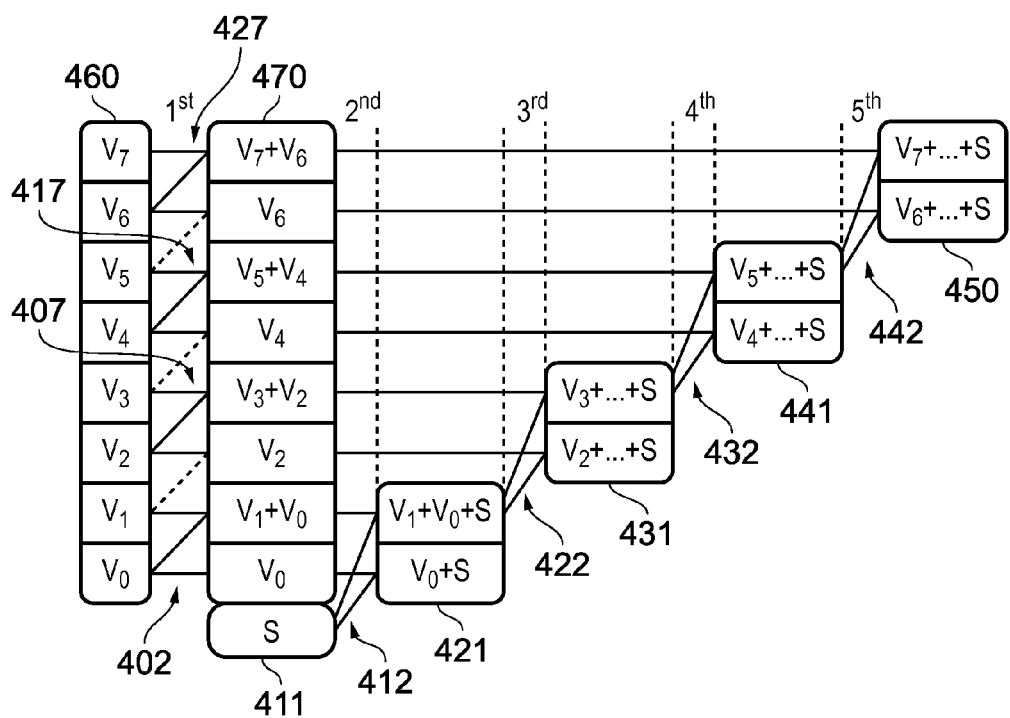
FIG. 12 schematically illustrates the partitioned vector scan operation of FIG. 10 in accordance with an alternative embodiment where the separate scan operations are performed in parallel.

The earlier described embodiments are concentrated on the two-part scan approach of FIG. 3. However, as discussed earlier, the vector elements of the input operands can be partitioned into any number of groups from 2 to N/2. FIG. 10 schematically illustrates the partitioning of a vector operand of 8 vector elements into N/2 groups, i.e. 4 groups in this example. As shown, each separate scan operation 402, 407, 417, 427 contains only a single part, but again each part can be executed over two stages using a two stage scan unit. There is also a separate computation operation 412, 422, 432, 442 for each group, and due to the data dependencies between these computation operations, their performance needs to be staggered in time. However, this is not the case for the separate scan operations 402, 407, 417, 427, since there are no data dependencies between those operations. Accordingly, as shown in FIG. 12, in an alternative embodiment, each of the four separate scan operations can be performed in parallel within a scan unit if desired, assuming the scan unit supports N lanes of parallel processing. As shown by the dotted diagonal lines in the first stage between the input vector elements 460 and the intermediate results 470, there is no interaction between the separate operations 402, 407, 417, 427 being performed in parallel, and hence there clearly are four separate scan operations being performed at that point. The performance of the computation operations 412, 422, 432, 442 is unchanged.

Figure 11A:
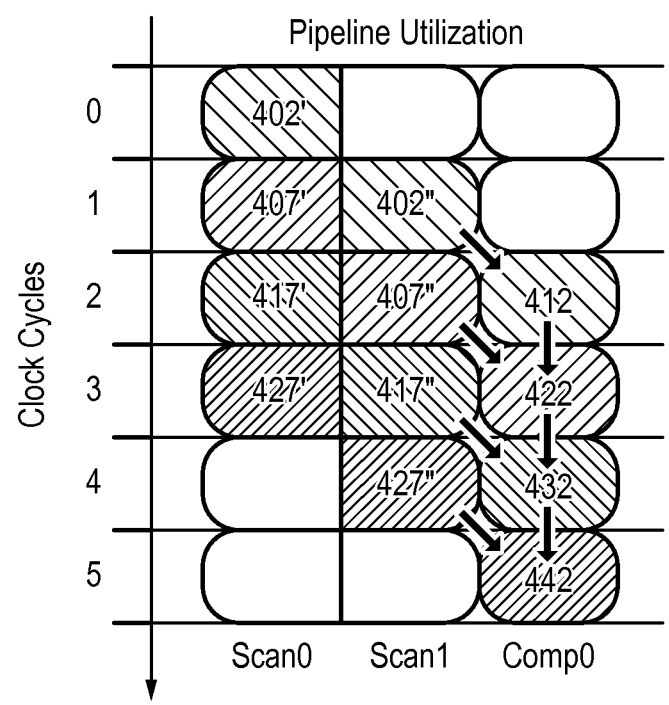
FIG. 11A illustrates the number of clock cycles required to perform the partitioned scan operation of FIG. 10 using the apparatus of FIG. 5, where both the scan unit and the ALU have N/2 lanes of parallel processing.

FIG. 11A illustrates a pipeline utilisation when performing the partitioned scan operation of FIG. 10, assuming an unbalanced hardware implementation such as that shown in FIG. 5, where both the scan unit 120 and the ALU 125 provide two lanes of parallel processing. As can be seen, very efficient use of the scan unit can be made, due to the lack of dependencies between the various separate scan operations.

Figure 11B:
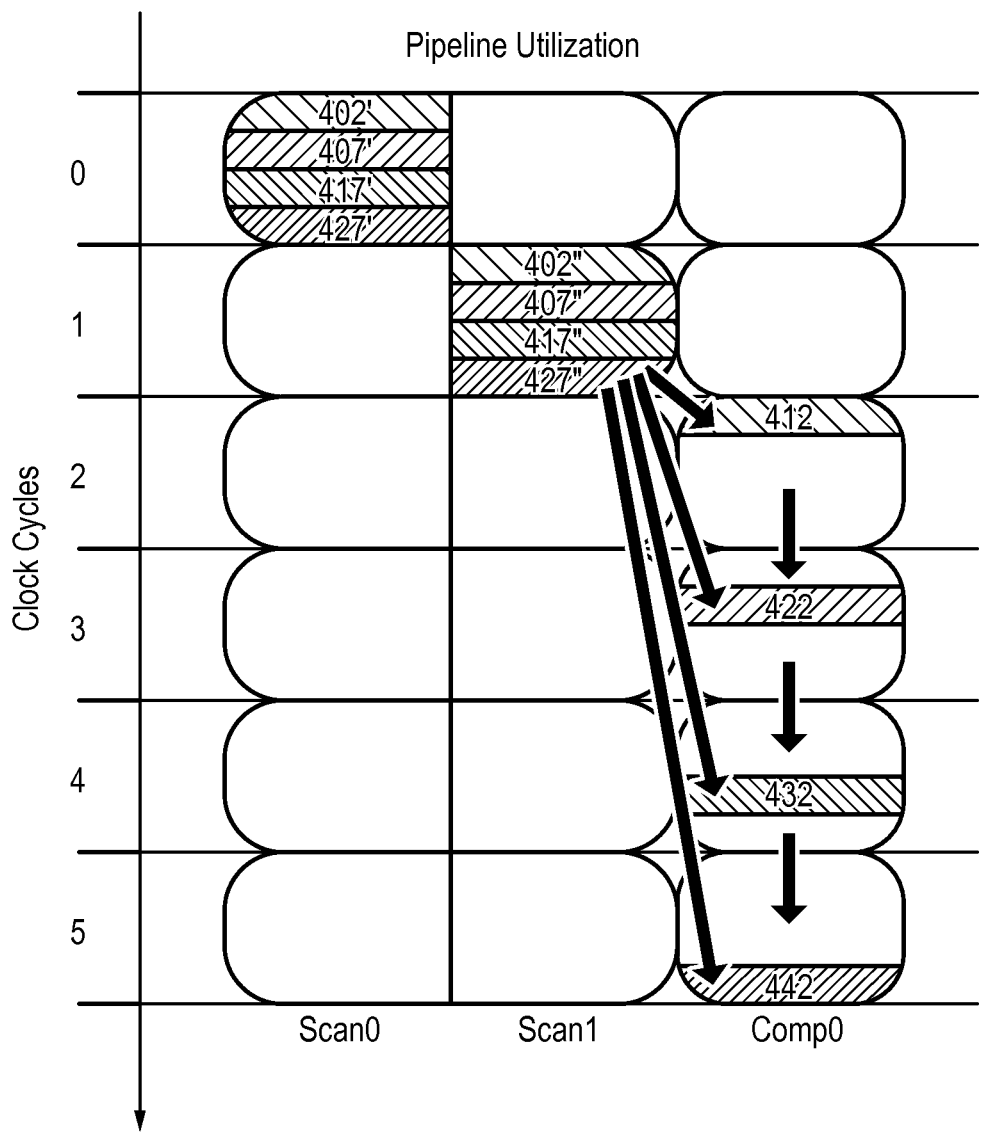
FIG. 11B illustrates the number of clock cycles required to perform the partitioned scan operation of FIG. 10 using the apparatus of FIG. 5, where both the scan unit and the ALU have N lanes of parallel processing.

FIG. 11B illustrates an alternative example where both the scan unit and the ALU provide eight lanes of parallel processing, and accordingly each of the separate scan operations can be performed in parallel within different subsets of the lanes. However, the separate computation operations still need to be separated into different clock cycles, due to the dependencies between those computation operations. Further, it is necessary to buffer the intermediate results produced by the various scan operations to enable those results to be forwarded to the computation stage within the ALU 125 at the required time. It should be noted that the approach of FIG. 11B can be used to implement the partitioned scan operation as shown in FIG. 12.

Figure 13A:
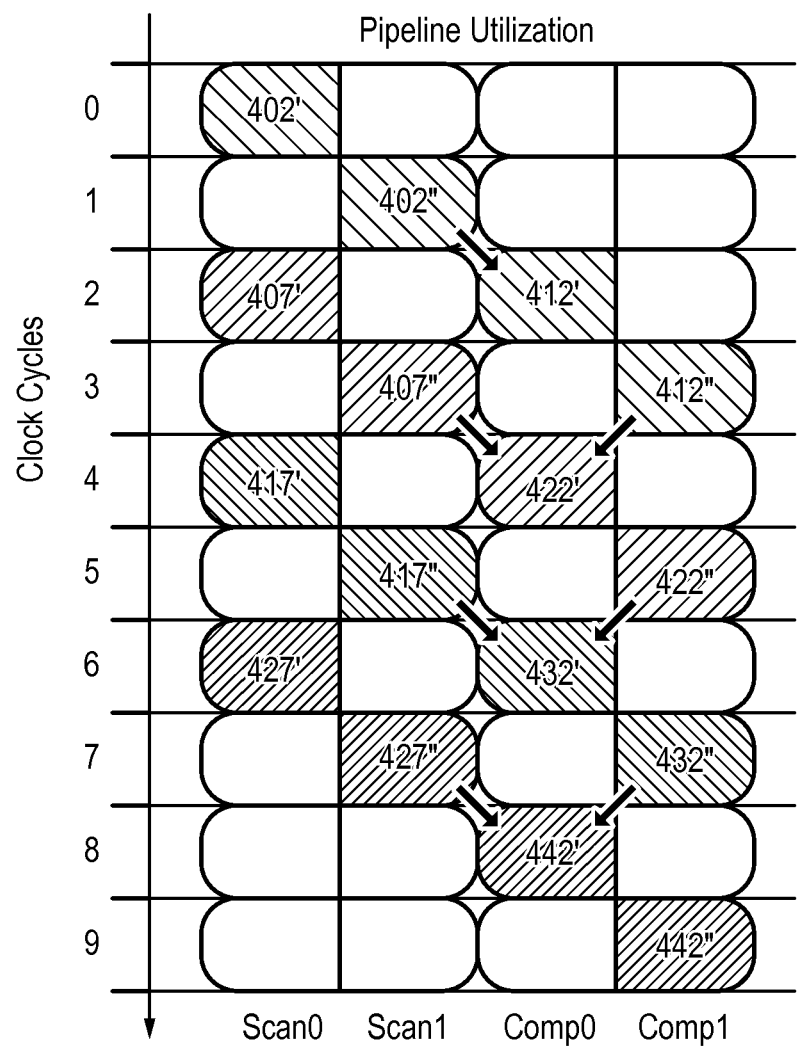
FIG. 13A illustrates the number of clock cycles required to perform the partitioned scan operation of FIG. 10 using the apparatus of FIG. 7, where both the scan unit and the ALU have N/2 lanes of parallel processing.
Figure 13B:
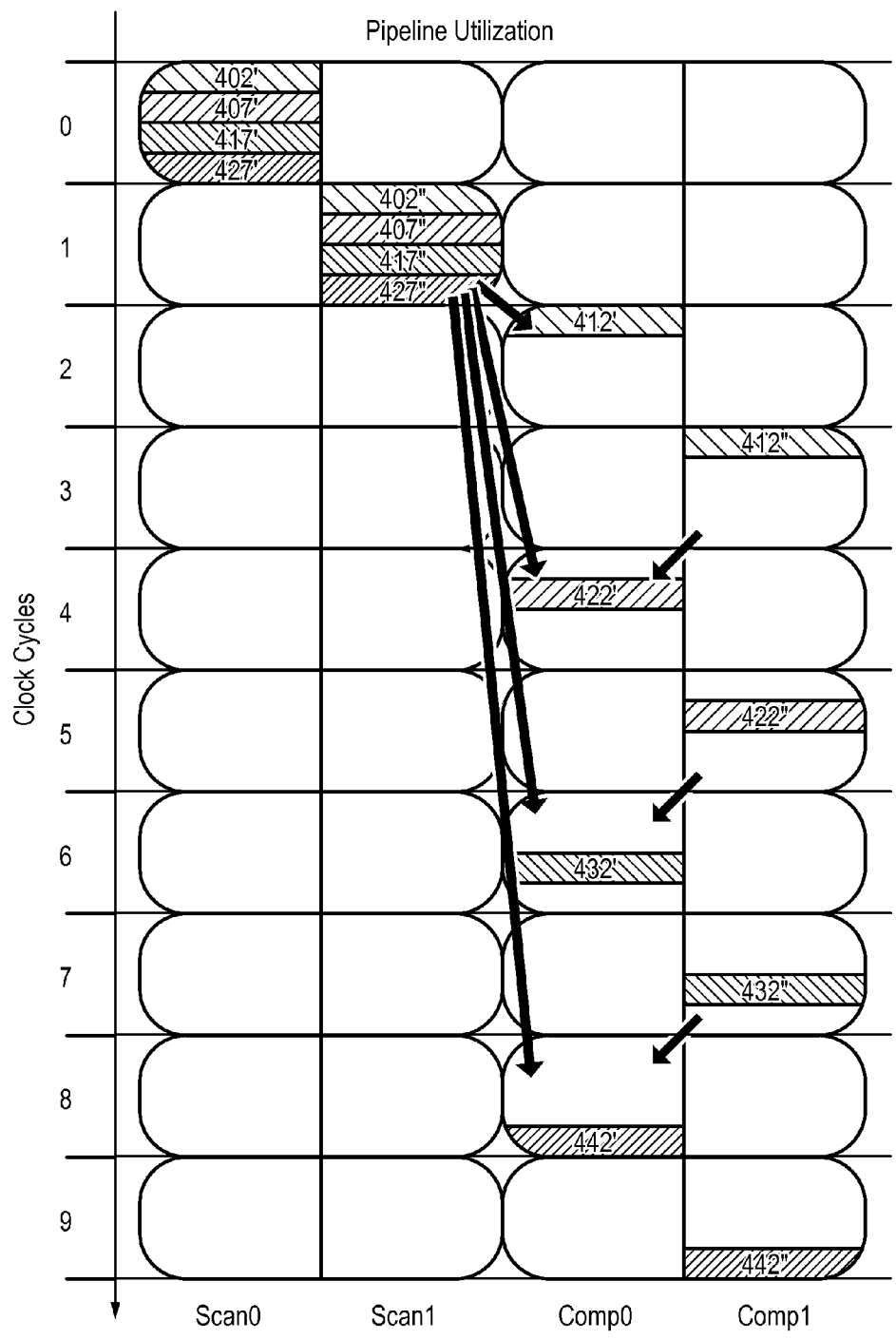
FIG. 13B illustrates the number of clock cycles required to perform the partitioned scan operation of FIG. 10 using the apparatus of FIG. 7, where both the scan unit and the ALU have N lanes of parallel processing.

FIGS. 13A and 13B are equivalent pipeline utilisation figures to those of FIG. 11A and 11B, but assume a balanced pipeline such as that shown in FIG. 7 is used. As can be seen from a comparison of FIGS. 13A and 13B with 11A and 11B, the performance drops significantly, due to the relatively slow computation operations (now requiring two cycles rather than one each) and the dependencies between those computation stages.

As will be apparent from the earlier discussed tables 1 and 2, as the degree of partitioning increases up to a maximum where the N vector elements of the vector operand are split into N/2 groups, then the number of operations decreases, hence enabling significant energy savings. However, particularly at the higher levels of partitioning, the performance can be significantly impacted (depending on the pipeline structure). Accordingly, the higher levels of partitioning when performing partitioned scan operations may be reserved for use with lower priority scan operations where the performance is not critical, and significant energy savings can be achieved by using a higher level of partitioning than may be used for higher priority scan operations.

Figure 14:
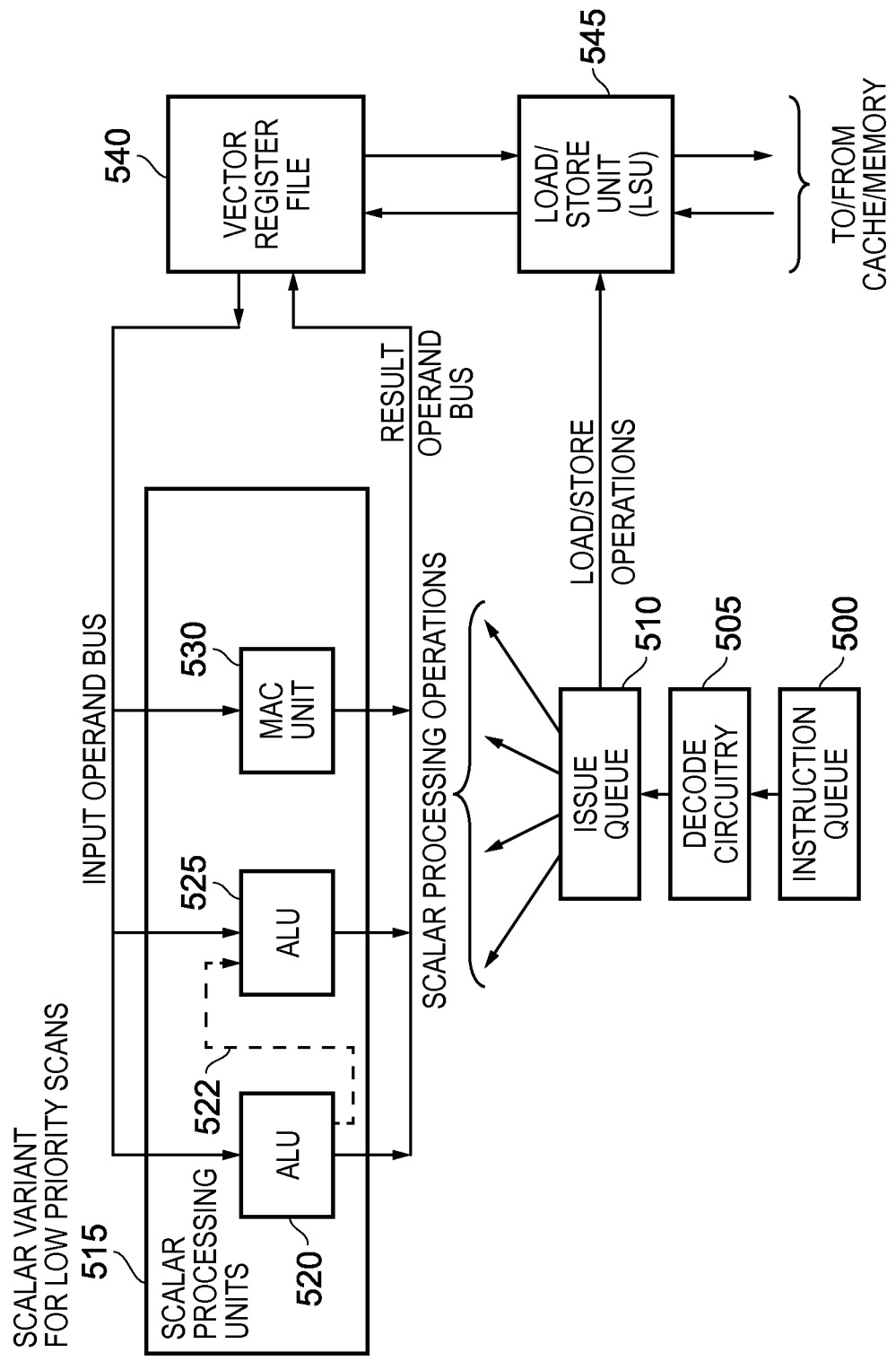
FIG. 14 is a block diagram of a data processing apparatus in accordance with an alternative embodiment.

Whilst the above described operations may be performed within vector processing units such as the earlier described vector scan units and vector ALU discussed for example with reference to FIG. 4A, in an alternative embodiment scalar processing units may be used to implement the required operations, for example by employing multiple iterations through the various scalar units to replicate the required operations. An example of an embodiment using scalar processing units is illustrated in FIG. 14. In a similar way to that discussed earlier with reference to FIG. 4A, instructions are retrieved from the instruction queue 500 and decoded through decode circuitry 505 in order to store appropriate control information within the issue queue 510. In this instance, the control information is used to employ various scalar processing units 515 multiple times in order to implement the required series of operations necessary in order to perform the earlier described partitioned scan operations. As before, a load/store unit is used to load vector operands into the vector register file 40, and to store vector operands from the vector register file back to memory. The LSU 545 may be a vector LSU, or in one embodiment could be a scalar LSU. In the latter case, multiple load operations would be required in order to load each of the required vector elements into the vector register file in order to form the required vector operand for the partitioned scan operation.

The scalar processing units 515 can take a variety of forms, but in the indicated embodiment comprise multiple ALUs 520, 525 and a MAC unit 530. A forwarding path 522 may be provided between the ALUs 520, 525 for use when performing scan operations.

Considering the example of FIG. 10 or 12, it will be seen that when the vector elements of the vector operand are partitions into N/2 groups, each group will contain two vector elements. Considering the first group consisting of the vector elements $V_0$ and $V_1$ as an example, it will be seen that the separate scan operation involves one actual operation, namely an operation to add $V_1$ to $V_0$. The associated computation operation then involves two separate addition operations, one to add $V_0$ to the scalar value and the other to add the intermediate result $V_1+V_0$ to the scalar value. The series of three operations can be performed by three iterations through the ALUs. For example, in one embodiment, the ALU 520 could be used to generate the intermediate result $V_1+V_0$, with the forwarding path 522 then being used to pass that intermediate result onto the ALU 525. In the next cycle the ALU 520 can perform the computation $V_0+S$, whilst the ALU 525 then adds the scalar value S to the intermediate result $V_1+V_0$ The ALUs can then be reused to perform each of the remaining operations illustrated in FIG. 10 or 12.

Whilst the scalar approach can in principle be used for any partitioned scan operations, it is more likely to be considered as an option when dealing with the higher degree of partitioned scan operations, such as where the vector operand is partitioned into N/2 groups. As discussed earlier, such a higher degree of partitioned scan operations achieve good energy savings, but with a significant impact on performance. Hence, they are likely to be used for lower priority scan operations. Further, the large number of groups may give rise to an increase in the complexity of the multiplexing required in a vector processing unit in order to implement the required separate scan operations and associated computation operations. Accordingly, in such instances, by using scalar processing circuitry it would be a possible to avoid introducing such complexities in the vector processing circuitry, which may be beneficial in certain implementations.

Figure 15A:
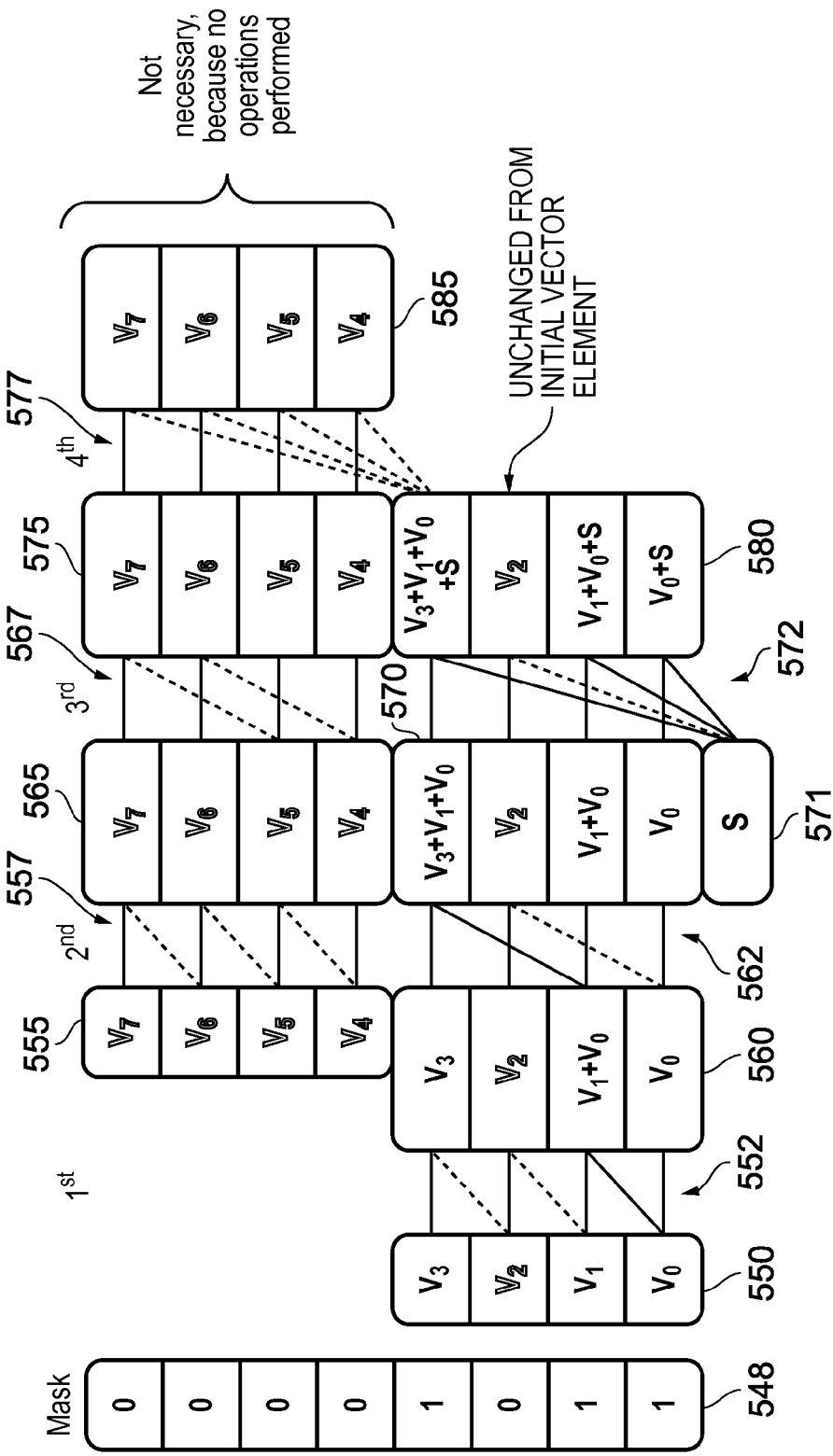
FIG. 15A illustrates the performance of a partitioned vector scan operation of a similar form to that discussed earlier with reference to FIG. 3, but where predicate information is specified within the vector scan instruction.

In one embodiment, the partitioned scan operation is applied in respect all of the N vector elements of the vector operand specified by the vector scan instruction. However, in an alternative embodiment, predicate control data is used to identify a sequence of vector elements within the vector operand that are to be subjected to the scan operation. The predicate control data can be specified in a variety of ways. For example it may be predetermined, or it may be programmable into a control register. In an alternative embodiment, the predicate control data is specified in the vector scan instruction itself. FIG. 15A illustrates one example of how the predicate control data can be used, in this case the predicate control data taking the form of the mask 548 providing a single bit value in association with each vector element of the originally specified vector operand.

In the example of FIG. 15A, it is assumed that a two part partitioned scan operation is performed, and accordingly the original vector operand is split into two parts 550, 555. In this example, a logic one value in the mask identifies that the corresponding vector element should be subjected to the scan operation, whereas a logic zero value indicates that the corresponding vector element should not be subjected to the scan operation. When considering the first part 552 of the separate scan operation applied to the first group 550, it can be seen that the effect of the mask is that two of the operations are not performed, namely those indicated by the dotted lines. As a result, the modified vector elements 560 are such that the original vector elements $V_3$, $V_2$ and $V_0$ are unchanged, and only the originally specified vector element $V_1$ has been altered by virtue of adding $V_0$ to it.

Considering then the second part 562 of the separate scan operation applied in respect of the first group 550, it can be seen that one of the two operations is omitted. As a result, the set of intermediate results 570 includes first and second intermediate results that are the same as would be generated in accordance with the technique of FIG. 3, whilst the third intermediate result is masked out (and in this case is nominally still the original vector element $V_2$), and the final intermediate result represents the addition $V_3+V_1+V_0$. When the computation operation 572 is then applied using the scalar value $S_1$, this results in the final results 580, again no computation being performed in respect of the lane containing the vector element $V_2$.

In this example, all of the upper four bits of the mask 548 are set to zero, which means that no processing needs to be performed in respect of the second group 555. In particular, both parts 557 and 567 of the separate scan operation for that group do not need to be performed, nor does the associated computation operation 577. This can give rise to further energy savings, and can also give rise to an increase in performance in certain situations. For example, in the particular instance of FIG. 15A, since the final computation operation 577 does not need to be performed, the partitioned scan operation can terminate early, thereby increasing performance. This is illustrated schematically in FIG. 15B which illustrates the earlier example of FIG. 8C performed using a balanced pipeline such as shown in FIG. 7. In particular, since the final computation operation 577 does not need to be performed, the process can terminate after 6 clock cycles rather than 8. Both parts 557 and 567 of the separate scan operation for the second group 555 are also indicated as not being performed. Alternatively, it may be that at least the first part 557 is executed prior to a final determination being made that the output of that part of the separate scan operation is no longer needed. Once it is determined that certain operations do not need to be performed, the processing circuitry within the relevant lanes may be clock gated in order to save further energy.

Figure 15B:
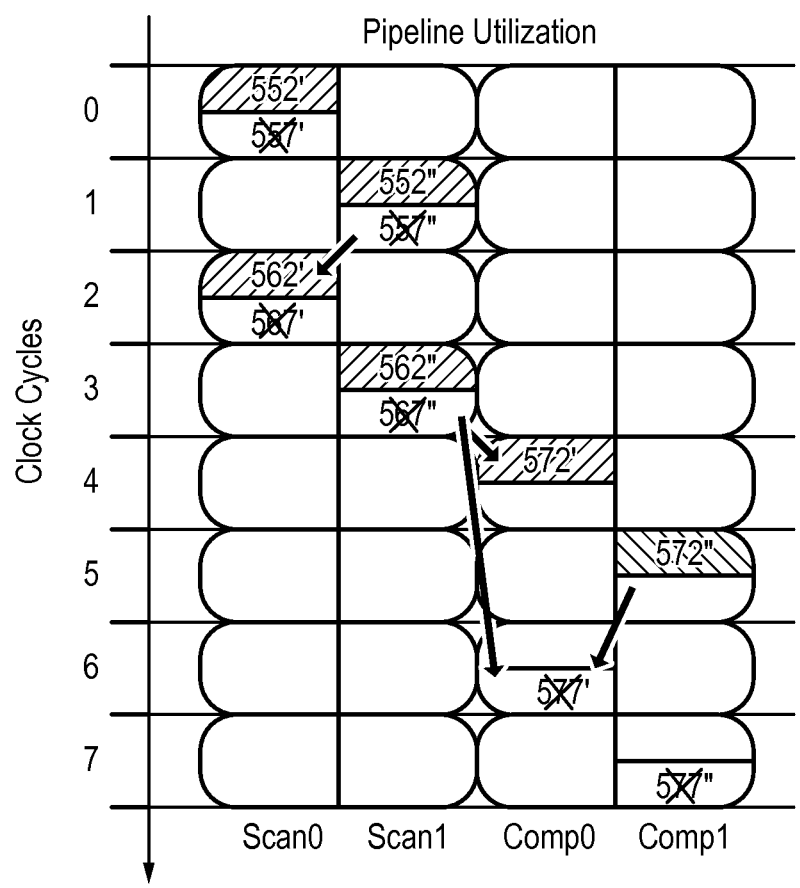
FIG. 15B illustrates the number of clock cycles required to perform the partitioned scan operation of FIG. 15A using the apparatus of FIG. 7, where both the scan unit and the ALU have N lanes of parallel processing.

Whilst FIG. 15B shows the performance gains that may be realised when compared to the approach of FIG. 8C, assuming the mask shown in FIG. 15A, it will be appreciated that performance savings can also be realised for the other described pipeline utilisation figures, namely those of FIGS. 6B, 6C, 8B, 11A, 11B, 13A or 13B.

As an alternative to the approach described in FIG. 15A it may be that wherever the mask has a logic zero value, this means that the corresponding final vector element in the result operand 580, 585 is set to a predetermined value, for example, a logic zero value. In this case, operations on both groups 550, 555 would still need to be performed, at least to the extent necessary to ensure that logic zero values are output in the relevant vector element positions in addition to the actual result elements produced for the live lanes whether the result vector elements contain the required scan result data.

Figure 16:
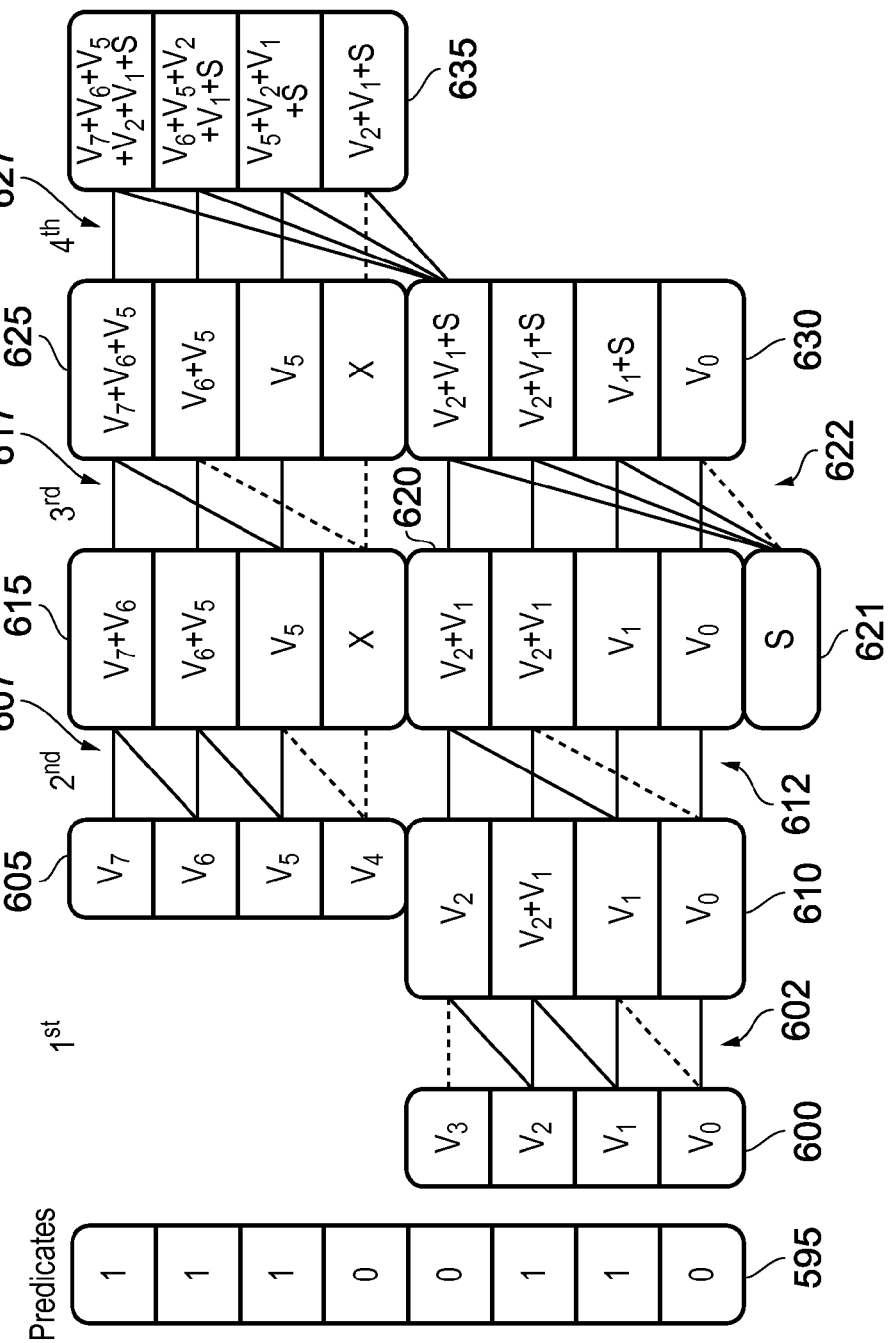
FIG. 16 illustrates the performance of a partitioned vector scan operation of a similar form to that discussed earlier with reference to FIG. 15A, but where the predicate information causes a different manipulation of the vector elements.

In other embodiments, the predicate values may introduce different behaviour to that discussed earlier to reference to FIG. 15A. FIG. 16 illustrates one example way in which the predicates may be used. In this example, the predicate data takes the form 595, and again it is assumed that a two part partitioned scan operation is performed. For each logic zero value in the predicate prior to the first logic one value, the corresponding vector element is replicated throughout the scan operation. Accordingly, it can be seen that the vector element $V_0$ is merely retained unamended throughout the intermediate stages 610, 620, and appears unamended in the final result 630. The vector element is also not propagated to any other lanes, thereby causing the vector element $V_1$ to pass unamended through to the intermediate stage 610, and also in the second part 612 of the scan operation causing the intermediate value $V_2+V_1$ to pass unamended from stage 610 into the intermediate result 620.

For all other logic zero values in the predicate, this causes the vector element at the preceding vector element position to be replicated into the lane position where the logic zero value is present. Hence, as shown by the first part 602 of the scan operation performed in respect of the first group 600, the presence of a logic zero value in association with the vector element $V_3$ causes the vector element $V_2$ to replace that vector element in the intermediate stage 610. The vector element associated with the logic zero value is also not used in any of the other computations. With regards to the vector element $V_3$ this has no effect since that vector element would not be propagated any further anyway due to the partitioning of the vector operand into two groups. However, with regard to the vector element $V_4$ within the second group 605, it can be seen that this causes the vector element $V_4$ not to be propagated onto the relevant computations within the first part 607 and second part 617 of the separate scan operation associated with second group 605. Also, the intermediate values associated with the vector element position of the vector element $V_4$ adopt the "do not care" state "x" in the intermediate stages 615, 625, since in the final computation stage 627, that value is overwritten by the value from the preceding vector element position, namely the value $V_2+V_1+S$. As a result, the final result of the operand is formed by the two parts 630, 635 shown in FIG. 16.

Figure 17A:
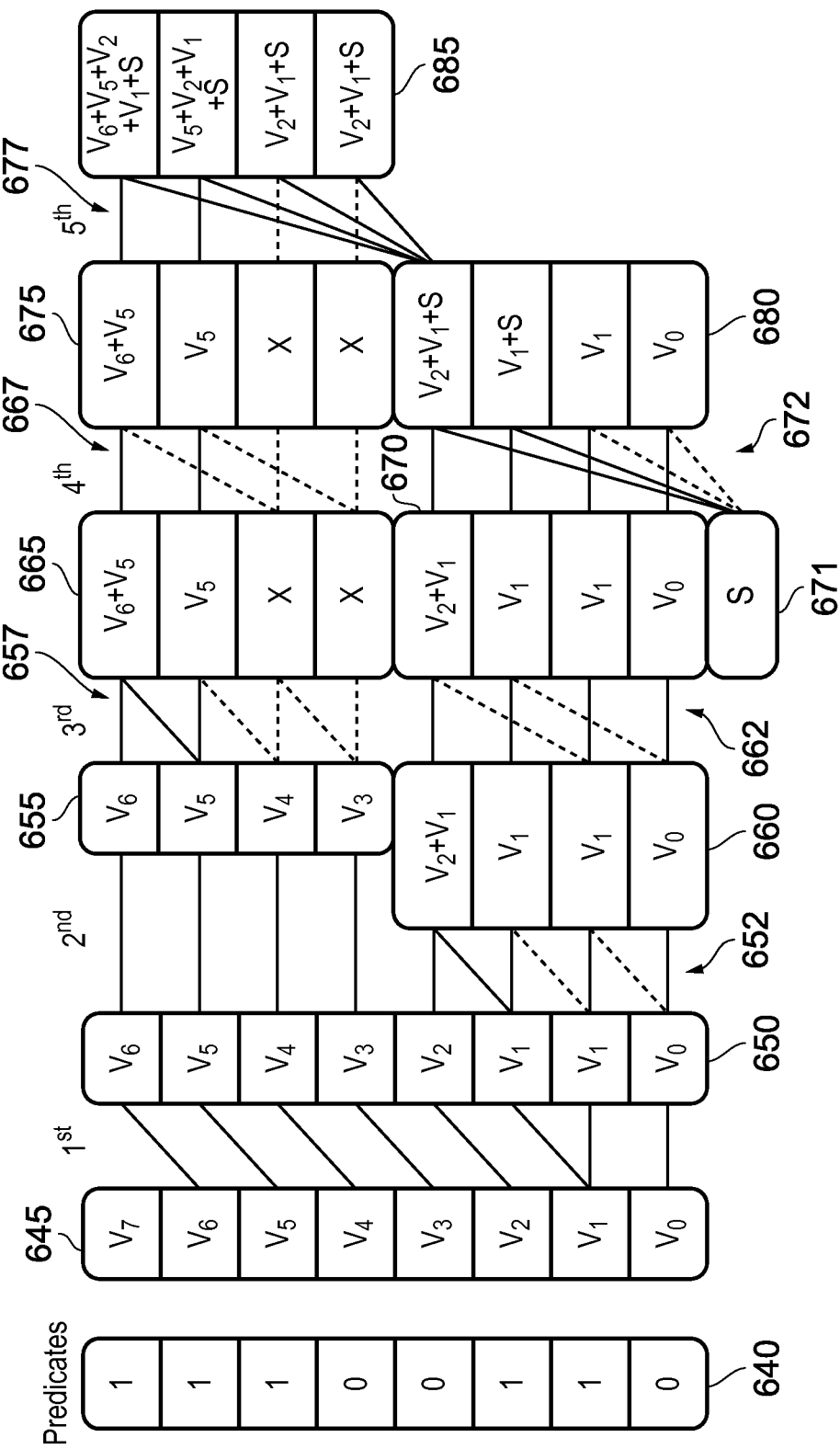
FIGS. 17A and 17B illustrate yet further different ways in which the vector elements may be manipulated in dependence on the predicate information, in accordance with different embodiments.

FIG. 17A illustrates another alternative variant in the way that the predicate information is used, in this case the predicate information 640 taking the same form as that shown in FIG. 16. The logic zero value associated with the vector element $V_0$ causes the same effect as discussed with reference to FIG. 16. However, in this instance, the first logic one value causes a replication of the vector element associated with that element position, in this instance the vector element $V_1$. In particular, the vector element $V_1$ is replicated into the adjacent lane, and all of the other vector elements are moved up one element position, with the vector element $V_7$ being discarded. Hence, the manipulation between the form 645 and 650 occurs before the resultant vector operand 650 is split into the two parts. The two-part partitioned scan operation is then performed as scheduled as shown in FIG. 17A, with the dotted lines indicating those operations that are not performed. As a result of the performance of the first scan operation consisting of the parts 652, 662 and the second scan operation consisting of the parts 657, 667, the intermediate results 670, 675 are produced. When the computation operations 672, 677 are then performed, this results in the result vector operand consisting of the two parts 680, 685 being produced.

Figure 17B:
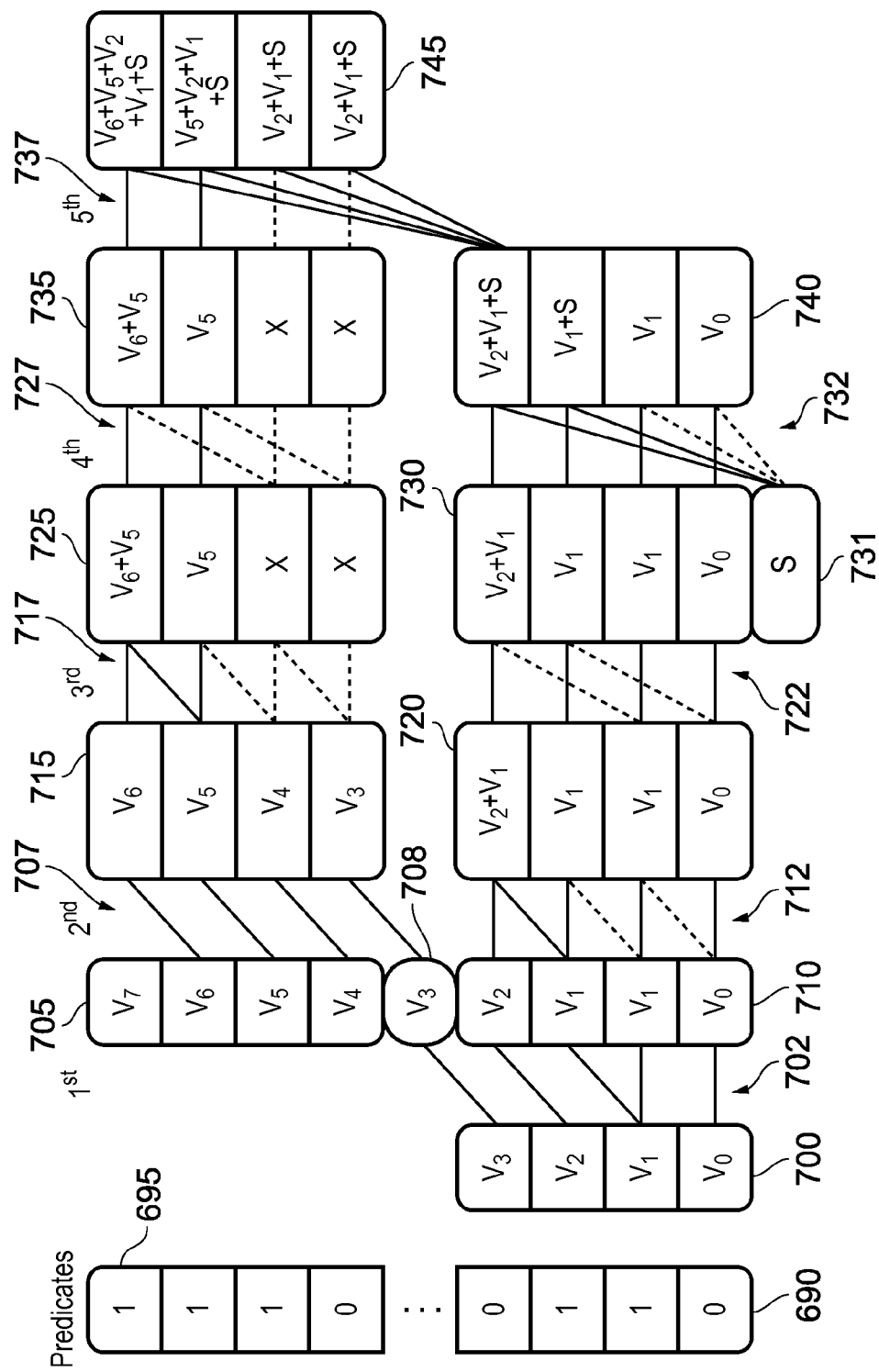

FIG. 17B illustrates the same functionality as in FIG. 17A, but where the re-arrangement of the input vector elements occurs after the vector operand has been split into the two groups. This requires the vector element $V_3$ 708 to be stored for one cycle before it can be provided in the second cycle to the scan operation associated with the second group 705. As will be seen from a comparison of FIGS. 17A and 17B, the first and second parts 712, 722 of the first separate scan operation correspond with the parts 652, 662 of the first scan operation of FIG. 17A, and similarly the first and second parts 717, 727 of the second separate scan operation correspond with the two parts 657, 667 of the second separate scan operation of FIG. 17B. Similarly, the computation operations 732, 737 correspond to the computation operations 672, 677 of FIG. 17A, and accordingly the result operand formed within the two parts 740, 745 in FIG. 17B corresponds directly with the result operand produced in FIG. 17A.

FIGS. 16, 17A and 17B are intended merely to provide illustrations of how predicate information can be used to modify the behaviour of the vector scan operation, and accordingly the behaviour of the partitioned scan operation providing the equivalent functionality. However, it will be appreciated that many other variants can be envisaged. In the general sense, the predicate information can be used to perform at least one of movement and modification of one or more vector elements within the vector operand, and such movement and/or modification may occur either during performance of the partitioned scan operation, or prior to the performance of the partitioned scan operation.

Figure 18:
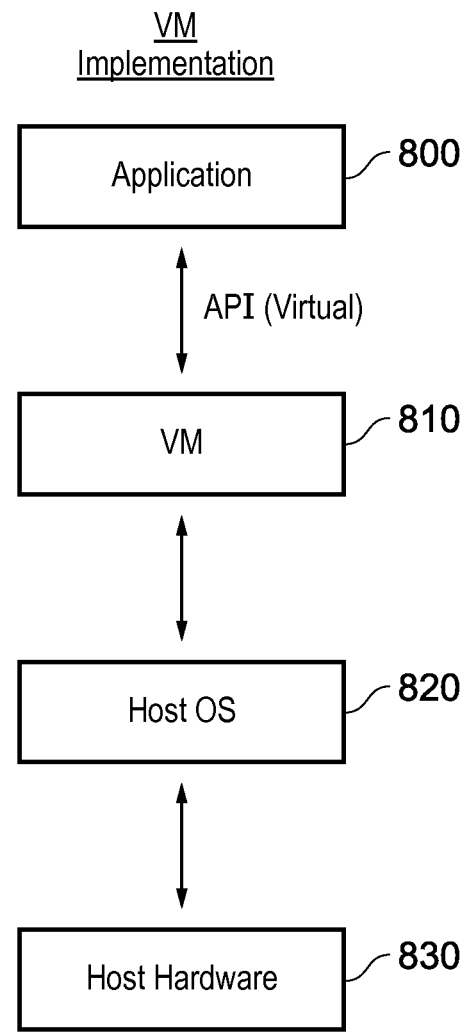
FIG. 18 schematically illustrates a virtual machine implementation of the data processing apparatus in accordance with one embodiment.

FIG. 18 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 830 typically running a host operating system 820 supporting a virtual machine program 810. Often, large powerful processors are required to provide virtual machine implementations which execute at a reasonable speed, but such an approach may be justified in certain circumstances, such as when there is a desire to run code native to another processor for compatibility or re-use reasons. The virtual machine program 810 is capable of executing an application program (or operating system) 800 to give the same results as would be given by execution of the program by such a real hardware device. Thus, the program instructions, including the vector scan instructions described above, may be executed from within the application program 800 using the virtual machine program 810.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
a vector register store configured to store vector operands;
processing circuitry configured to perform operations on vector operands retrieved from said vector register store;
control circuitry configured to control the processing circuitry to perform the operations required by one or more instructions, said one or more instructions including a vector scan instruction specifying a vector operand comprising N vector elements and defining a scan operation to be performed on a sequence of vector elements within the vector operand;
the control circuitry being responsive to the vector scan instruction to partition the N vector elements of the specified vector operand into P groups of adjacent vector elements, where P is between 2 and N/2, and to control the processing circuitry to perform a partitioned scan operation yielding the same result as the defined scan operation, the processing circuitry being configured to perform the partitioned scan operation by performing separate scan operations on those vector elements of the sequence contained within each group to produce intermediate results for each group, and to perform a computation operation to combine the intermediate results into a final result vector operand containing a sequence of result vector elements.

2. A data processing apparatus as claimed in claim 1, wherein said sequence of vector elements on which the scan operation is to be performed comprise all N vector elements within the specified vector operand.

3. A data processing apparatus as claimed in claim 1, wherein the control circuitry is configured to determine said sequence of vector elements on which the scan operation is to be performed with reference to predicate control data.

4. A data processing apparatus as claimed in claim 1, wherein said vector scan instruction further specifies a scalar carry-in value forming an input for the defined scan operation, and the processing circuitry is configured to employ the scalar carry-in value as an input during performance of the partitioned scan operation.

5. A data processing apparatus as claimed in claim 4, wherein the processing circuitry is configured to employ the scalar carry-in value as an input to the computation operation in order to combine the scalar carry-in value with the intermediate results during generation of the final result vector operand.

6. A data processing apparatus as claimed in claim 1, wherein said processing circuitry comprises SIMD processing circuitry providing a plurality of lanes of parallel processing, each lane being configured to operate on one vector element of each vector operand provided to the SIMD processing circuitry.

7. A data processing apparatus as claimed in claim 6, wherein the number of lanes of parallel processing is equal to the number of vector elements in each of said P groups.

8. A data processing apparatus as claimed in claim 6, wherein the processing circuitry is configured to perform said separate scan operations sequentially.

9. A data processing apparatus as claimed in claim 8, wherein said SIMD processing circuitry comprises a plurality of pipeline stages used to implement each separate scan operation, and performance of said separate scan operations is partially overlapped.

10. A data processing apparatus as claimed in claim 6, wherein the number of lanes of parallel processing is a multiple M of the number of vector elements in each of said P groups, and the processing circuitry is configured to perform M separate scan operations in parallel, with each of the M separate scan operations being allocated to a different subset of the lanes.

11. A data processing apparatus as claimed in claim 6, wherein the control circuitry is responsive to the vector scan instruction to partition the N vector elements of the specified vector operand into 2 groups.

12. A data processing apparatus as claimed in claim 11, wherein the SIMD processing circuitry comprises one or more SIMD processing units used to perform said partitioned scan operation, and at least one of said one or more SIMD processing units has N/2 lanes of parallel processing.

13. A data processing apparatus as claimed in claim 1, wherein the processing circuitry is configured to perform the computation operation by performing separate computation operations on the intermediate results for each group, each separate computation operation comprising combining the intermediate results for the associated group with a carry-in value.

14. A data processing apparatus as claimed in claim 13, wherein the groups are ordered from a first group to a final group, and the processing circuitry is configured to perform the separate computation operations staggered in time such that, for all groups other than the first group, the carry-in value is provided by one of the result vector elements generated by the separate computation operation performed for the preceding group.

15. A data processing apparatus as claimed in claim 14, wherein for the first group, the carry-in value is provided by a scalar carry-in value specified by the vector scan instruction.

16. A data processing apparatus as claimed in claim 1, wherein each separate scan operation is performed in one or more parts.

17. A data processing apparatus as claimed in claim 16, wherein the processing circuitry is configured to perform each part of each separate scan operation in multiple pipeline stages.

18. A data processing apparatus as claimed in claim 13, wherein:
each separate scan operation is performed in one or more parts, and the processing circuitry is configured to perform each part of each separate scan operation in multiple pipeline stages;
the processing circuitry is configured to perform each separate computation operation in one or more pipeline stages.

19. A data processing apparatus as claimed in claim 18, wherein the processing circuitry is configured to perform each separate computation operation in less pipeline stages than are used to perform each part of each separate scan operation.

20. A data processing apparatus as claimed in claim 1, wherein the control circuitry is responsive to the vector scan instruction to partition the N vector elements of the specified vector operand into N/2 groups.

21. A data processing apparatus as claimed in claim 1, wherein the processing circuitry comprises one or more scalar processing units used to perform the partitioned scan operation under control of the control circuitry.

22. A data processing apparatus as claimed in claim 3, wherein if the predicate control data identifies that all of the adjacent vector elements in a particular group are not within said sequence of vector elements on which the scan operation is to be performed, the processing circuitry is configured to omit processing of at least one of the separate scan operation for that particular group and the associated part of the computation operation.

23. A data processing apparatus as claimed in claim 3, wherein said predicate control data is used to perform at least one of movement and modification of one or more vector elements within the vector operand.

24. A data processing apparatus as claimed in claim 23, wherein said at least one of movement and modification of one or more vector elements within the vector operand is performed prior to performance of said partitioned scan operation.

25. A data processing apparatus as claimed in claim 23, wherein said at least one of movement and modification of one or more vector elements within the vector operand is performed during performance of said partitioned scan operation.

26. A method of executing a vector scan instruction within a data processing apparatus having a vector register store for storing vector operands, and processing circuitry for performing operations on vector operands retrieved from said vector register store, the vector scan instruction specifying a vector operand comprising N vector elements and defining a scan operation to be performed on a sequence of vector elements within the vector operand, the method comprising:
partitioning the N vector elements of the specified vector operand into P groups of adjacent vector elements, where P is between 2 and N/2; and
controlling the processing circuitry to perform a partitioned scan operation yielding the same result as the defined scan operation, the processing circuitry performing the partitioned scan operation by:
performing separate scan operations on those vector elements of the sequence contained within each group to produce intermediate results for each group; and
performing a computation operation to combine the intermediate results into a final result vector operand containing a sequence of result vector elements.

27. A computer program product storing in a non-transitory form a computer program for controlling a computer to provide a virtual machine execution environment for program instructions corresponding to a data processing apparatus as claimed in claim 1.

28. A data processing apparatus comprising:
a vector register means for storing vector operands;
processing means for performing operations on vector operands retrieved from said vector register means;
control means for controlling the processing means to perform the operations required by one or more instructions, said one or more instructions including a vector scan instruction specifying a vector operand comprising N vector elements and defining a scan operation to be performed on a sequence of vector elements within the vector operand;
the control means, responsive to the vector scan instruction, for partitioning the N vector elements of the specified vector operand into P groups of adjacent vector elements, where P is between 2 and N/2, and for controlling the processing means to perform a partitioned scan operation yielding the same result as the defined scan operation, the processing means for performing the partitioned scan operation by performing separate scan operations on those vector elements of the sequence contained within each group to produce intermediate results for each group, and for performing a computation operation to combine the intermediate results into a final result vector operand containing a sequence of result vector elements.

* * * * *